United States Patent

[11] 3,623,008

[72] Inventors Anton H. Doblmaier
Summit, N.J.;
John A. Harr, Geneva, Ill.; Frank F. Taylor, West Chicago, Ill.; Werner Ulrich, Glen Ellyn, Ill.
[21] Appl. No. 685,691
[22] Filed Nov. 24, 1967
[45] Patented Nov. 23, 1971
[73] Assignee Bell Telephone Laboratories, Incorporated
New York, N.Y.
Original application Dec. 31, 1963, Ser. No. 334,875, now Patent No. 3,570,008.
Divided and this application Nov. 24, 1967, Ser. No. 685,691

[54] PROGRAM-CONTROLLED DATA-PROCESSING SYSTEM
47 Claims, 10 Drawing Figs.

[52] U.S. Cl. 340/172.5
[51] Int. Cl. G06f 9/06
[50] Field of Search 340/172.5

[56] References Cited

UNITED STATES PATENTS

| | | | |
|---|---|---|---|
| 3,156,897 | 11/1964 | Bahnsen | 340/172.5 |
| 3,242,464 | 3/1966 | Rakoczi | 340/172.5 |
| 3,242,465 | 3/1966 | Gloates | 340/172.5 |
| 3,254,329 | 5/1966 | Lukoff | 340/172.5 |

*Primary Examiner*—Gareth D. Shaw
*Assistant Examiner*—R. F. Chapuran
*Attorneys*—R. J. Guenther and James Warren Falk

ABSTRACT: A program-controlled data-processing system in which "three-cycle overlap" execution of program instructions is employed. The processor comprises three circuit arrangements which are concurrently operative with respect to three successive program order words. Each order word which is executed by the control arrangement is first brought into one circuit arrangement (the Buffer Order Word Register) and at a discrete time thereafter each instruction is moved to a second circuit arrangement (the Order Word Register). While the order word is in the Buffer Order Word Register, the instruction portion of the order word is decoded by a corresponding decoder circuit (the Buffer Order Word Decoder) and while it resides in the Order Word Register the instruction portion of the order word is decoded by a second decoder, namely, the Order Word Decoder. The third circuit arrangement serves to transmit commands to the program store to obtain a next succeeding order word from the Buffer Order Word Register.

INVENTORS A H DOBLMAIER
J A HARR
F F TAYLOR
W ULRICH
BY John C Albrecht
ATTORNEY

PATENTED NOV 23 1971

FIG. 9

| | INDEX REG. MODIFICATION OPTIONS | | | MASKING OPTIONS | | | | COMPLEMENT | SET C FF |
|---|---|---|---|---|---|---|---|---|---|
| | A | W | REG S | PL | EL | PS | ES | | |
| W ORDERS | | | | | | | | | |
| WL PWX PWY PWZ UWX UWY UWZ | X | | | | | | | X | X |
| WF WJ WX WY WZ CWK CWKU | X | | | X | | X | | X | X |
| WB | X | | | X | X | X | X | X | X |
| WK PWK UWK XWK WA WAS WSF WD | X | | | X | | X | | X | |
| AWK SWK | X | | | X | | X | | | |
| CWR | | | | X | | X | | | X |
| AWRP | | | | X | | | | X | |
| WV | X | | | X | X | X | X | X | |
| MEMORY READING ORDERS | | | | | | | | | |
| MB MBCS NB | X | X | X | | | X | | | |
| ML NL PMX PMY PMZ UMX UMY UMZ | X | X | X | | | | | X | X |
| MK PMK UMK XMK MKII NK GKC HKU XGKU XHKC MA MAS MSF MD | X | X | X | X | | X | | X | |
| AMK SMK | X | X | X | X | | X | | | |
| MF MJ MX MY MZ NF NJ NX NY NZ MC MCLF MCII CMK CMKU JKMSF | X | X | X | X | | X | | X | X |
| NBTA NBTB UMKMJ | X | X | X | | | | | | |
| KMKXS KMKUS | X | X | X | | | | | | X |
| MEMORY WRITING ORDERS | | | | | | | | | |
| LM LN LG LH | X | X | X | X | X | X | X | X | |
| FM JM KM XM YM ZM FN JN KN XN YN ZN FG FH KG KH | X | X | X | X | X | X | X | X | |
| OM AM BMAP | X | X | X | | | | | | |
| BM BN BG BH BMOP | X | X | X | | | | X | | |
| WNPS | | | | | | | | | |
| TRANSFER ORDERS | | | | | | | | | |
| ENTJ T TK--- TC--- TZRFU TZRFZ | X | X | X | | | | | | |
| TR--- | X | | X | X | | | | | X |
| TAULM | X | X | X | | X | | | X | |
| TAUMK TCGMX TCMMF TUPMK | X | X | X | X | | X | | X | |
| MISCELLANEOUS ORDERS | | | | | | | | | |
| NO-OP NO-OPF GBN | | | | | | | | | |
| EMMS | X | | | | | | | X | |
| H HC Q QC QS QSC | X | | | | | | | | |
| EXC | X | X | X | | | | | | |
| ABR--- SBR--- | | | | X | | X | | | X |

PROGRAM-CONTROLLED DATA-PROCESSING SYSTEM

CROSS REFERENCES TO RELATED APPLICATIONS

This is a division of copending application, Ser. No. 334,875, now U.S. Pat. No. 3,570,008, filed Dec. 31, 1963, and relates to a program-controlled data-processing system.

BACKGROUND OF THE INVENTION

A measure of the ability of a data processor to serve large numbers of input and output devices is termed "data-processing capacity." This measure is directly proportional to the processing per unit time performed by the processor. In "real time" data processing systems, the data-processing capacity is of extreme importance, since this may be a limiting factor in determining the number of data and program order word sources which may be served. Furthermore, although a data processor may not be working in a real time environment, the operating cost of complex data-processing systems is high and it is important that a data processor be both efficient and reliable.

There are obvious expedients, such as the use of high-speed circuit components which tend to increase the data processing per unit time; however, the use of such high speed elements does not insure either system reliability or system efficiency. High-speed system elements are generally more expensive and often less reliable than corresponding moderate speed elements. The term "system efficiency" as employed herein relates to organization of the processor elements and even though a system employs high-speed circuit elements, the overall operation of the data processor may be extremely inefficient because of its internal organization.

It is an object of this invention to increase the data processing capacity of a program controlled data processor without reliance on high speed system elements.

SUMMARY OF THE INVENTION

In accordance with the invention, the processor memory comprises a first memory containing sequences of program order words and a second memory containing data; and the control arrangement of the processor comprises a plurality of circuit arrangements which are concurrently operative with respect to a plurality of successive program order words. The control arrangement comprises:

a. A first circuit arrangement comprising a first register and a first order word decoder responsive to a first order word of a sequence and arranged to carry out data processing specified by the first order word, b. A second circuit arrangement comprising a second register and a second decoder responsive to an immediately succeeding second order word and arranged to carry out data processing specified by the second order word, and c. A third circuit arrangement which is arranged to generate and transmit a coded signal to the memory arrangement to obtain for the second circuit arrangement a next succeeding third order word therefrom.

It is a feature of this invention that the data processor executes successive program order words on an overlap basis. The overlap process employed in accordance with this invention is termed three-cycle overlap herein. The use of three-cycle overlap operation increases the rate at which the processor is able to obtain and execute program order words without reducing the period of time allocated to the obtaining and execution of such order words.

It is another feature of this invention that the control arrangement comprises a clock circuit to define control arrangement time cycles and to transfer each succeeding order word from the second circuit arrangement to the first circuit arrangement at a particular time in each control arrangement time cycle whereby each of the first, second and third circuit arrangements is operative with respect to each order word which is executed by the control arrangement.

It is a further feature of this invention that the memory arrangement is divided into a first memory containing the sequences of program order words and a second memory containing data. Advantageously, this arrangement permits communication between the control arrangement and the second or data memory without interference with the obtaining of order words from the first memory.

In accordance with another feature of this invention, the control arrangement comprises a third decoded circuit, termed a "mixed decoded," which is connected to output terminals of the first and second order word registers, the mixed decoder being responsive to the contents of the connected register circuits to generate output signals for altering the operation of the processor with respect to output signals of the second decoder circuit.

Advantageously by this arrangement a first order word may prescribe a particular register location within the control arrangement as a destination register and the immediately succeeding order word may prescribe the same register as a data source. Although the processing required by the first order word is not completed in sufficient time to have the resultant word stored in the commonly prescribed register, the mixed decoder alters the operation of the processor to assure that the resulting data is employed in the execution of the immediately succeeding second order word.

BRIEF DESCRIPTION OF THE DRAWING

FIG. 9 is a table which illustrates the options and features applicable to orders employed in the processor.

GENERAL DESCRIPTION

Figure 4:
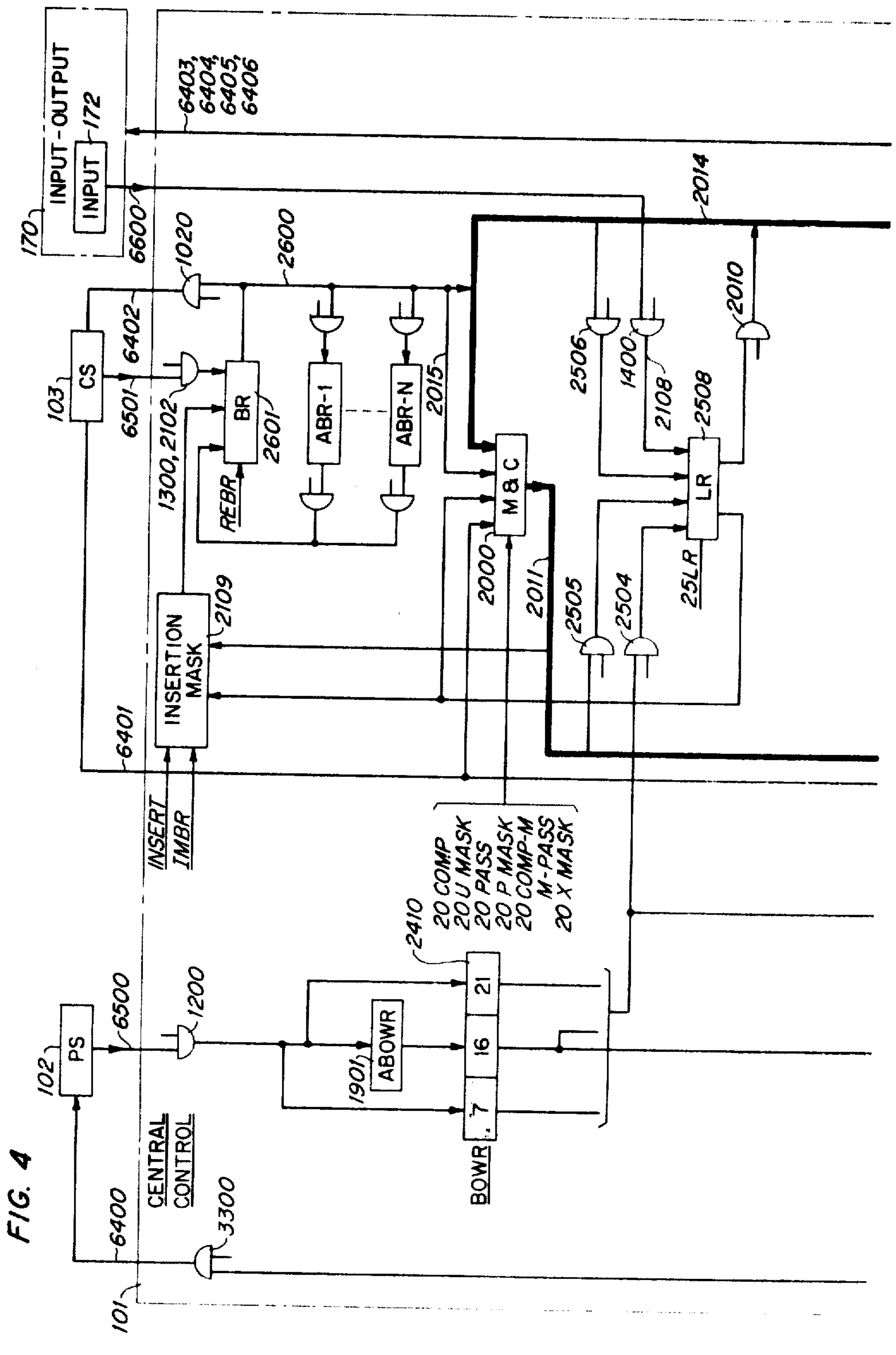
FIGS. 4 through 6, arranged as shown in FIG. 10, comprise the processor of FIG. 1.
Figure 5:
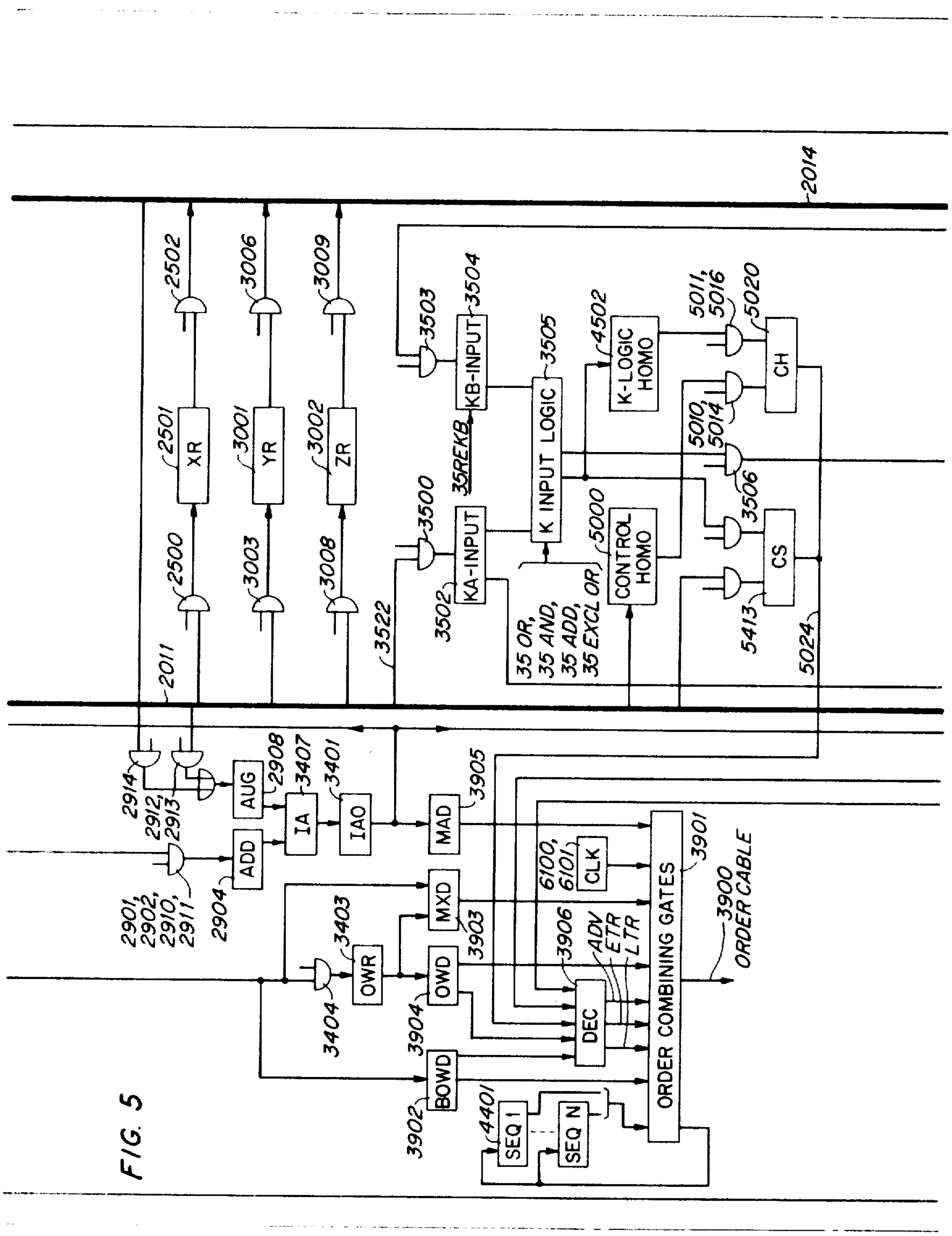
Figure 6:
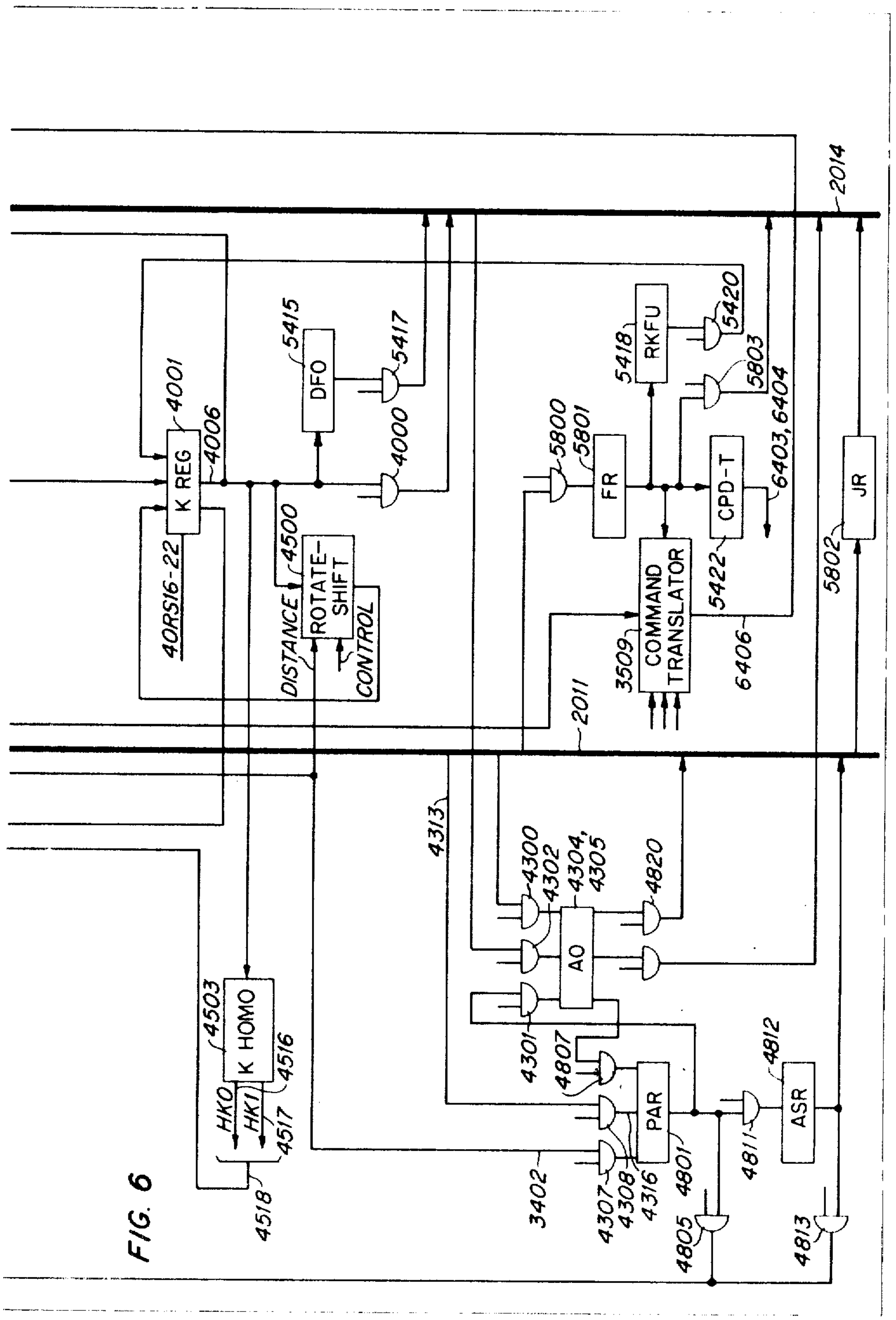

The organization of a data processing system in accordance with this invention is shown in FIGS. 4 through 6. These figures show the interconnection of the Program Store 102, the Call Store Memory 103, the Input-Output System 170 and the Control Arrangement 101.

The Program Store 102 is a semipermanent memory which contains sequences of program order words and certain data which is infrequently changed. The Call Store 103 is a read and write memory which contains data which may be changed at frequent intervals.

Figure 7:
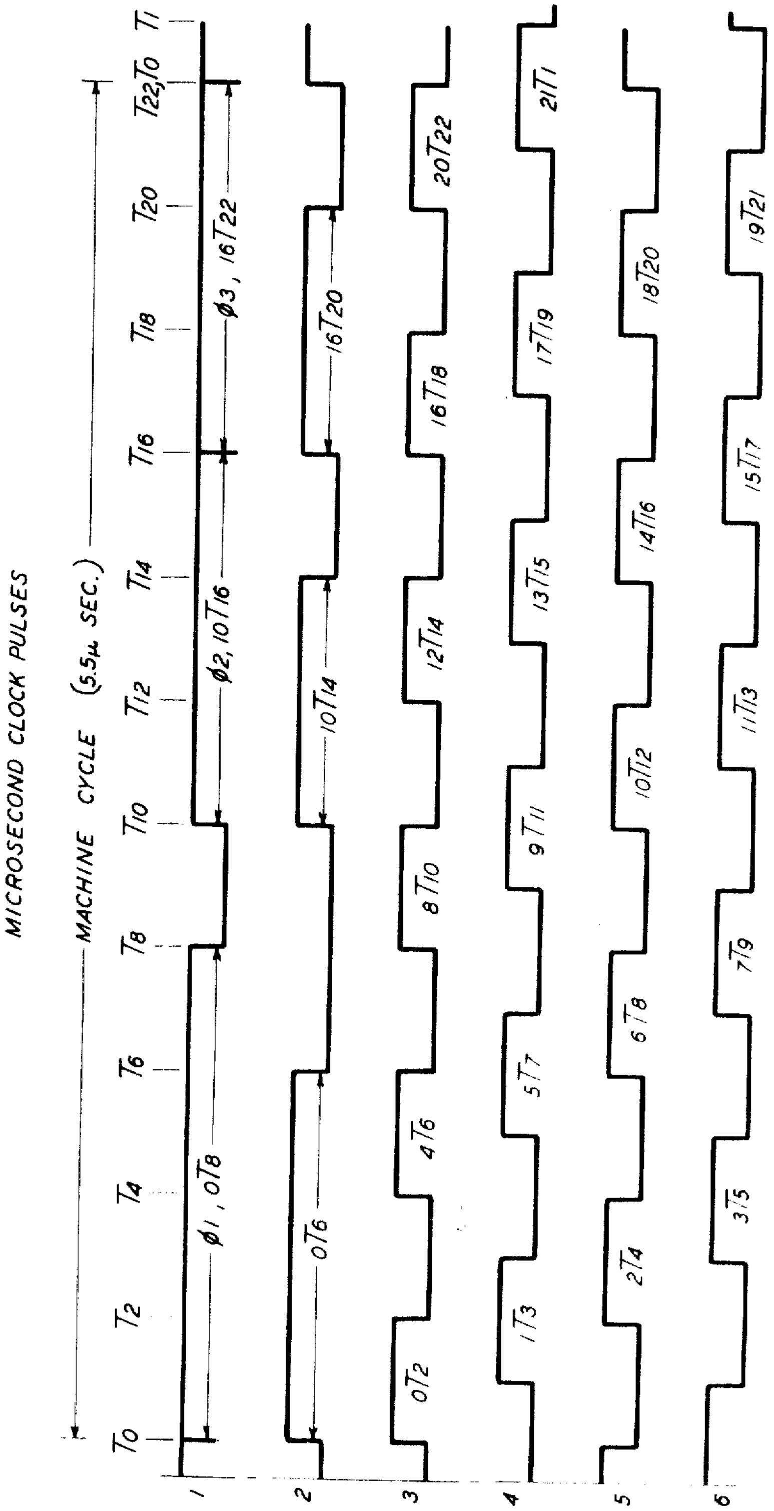
FIG. 7 is a time diagram.
Figure 8:
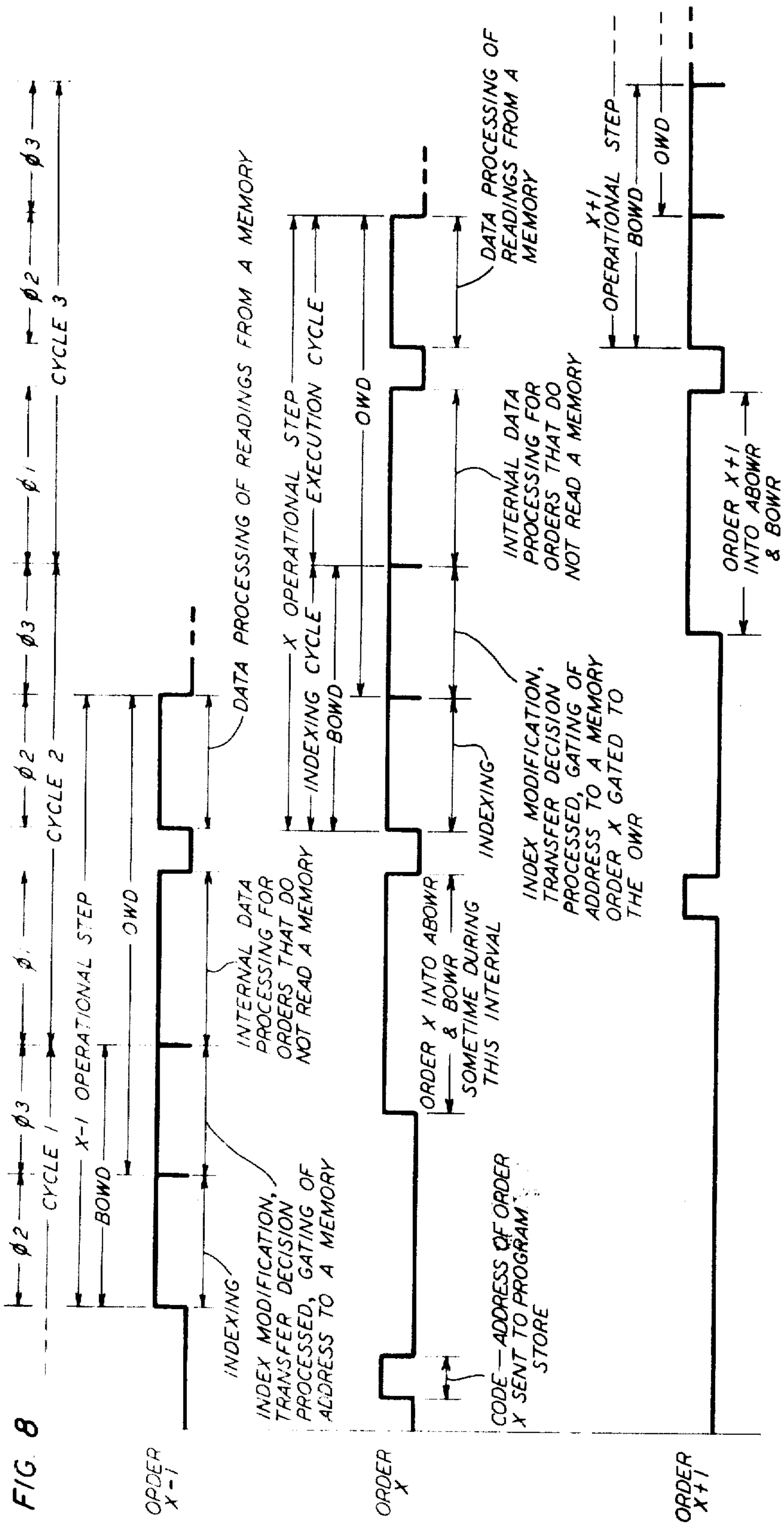
FIG. 8 is a time diagram which illustrates the processing of three successive program order words.

The basic time cycle employed in the processor is illustrated in FIG. 7 and data processing in accordance with three-cycle overlap is shown in FIG. 8. The basic machine cycle is 5.5 microseconds long. As shown in FIG. 7, the machine cycle comprises three portions, namely, Phase 1, Phase 2 and Phase 3. The Clock 6100, 6101 of FIG. 5 supplies the internal timing pulses for the Control Arrangement. As shown in lines 3 through 6 of FIG. 7, there are a plurality of clock pulses, each having a duration of one-half microsecond, which originate at one-quarter microsecond intervals. The 5.5-microsecond machine cycle is divided into 22½-microsecond intervals.

As previously noted herein, the control arrangement 101 comprises three circuit arrangements which are concurrently operative with respect to three successive program order words. These three circuit arrangements are:

1. The Buffer Order Word Register 2410 and the Buffer Order Word Decoder 3902;

2. the Order Word Register 3403 and the Order Word Decoder 3904; and 3. the Program Address Register 4801 and the Gating Circuits 4805 and 3300.

Each order word which is executed by the Control Arrangement is fetched from the Program Store 102 by means of an address obtained from the Program Address Register 4801. Each order word is first brought into the Buffer Order Word Register 2410. While an order word is in the Buffer Order Word Register 2410, indexing is initiated and additionally the instruction portion of the order word is decoded by the Buffer Order Word Decoder 3902. Examples of data processing which is performed while an instruction resides in the Buffer Order Word Register 2410 are set forth later herein.

The time signals provided by the Clock Circuit 6100, 6101 comprise signals for transferring the order words from the one circuit arrangement (i.e., from the Buffer Order Word Register 2410) to a second circuit arrangement (i.e., the Order Word Register 3403) at a particular time in the 5.5 microsecond machine cycle. The Order Word Decoder 3904 is connected to the output terminals of the Order Word Register 3403 and serves to carry out further data processing in accordance with the instruction portion of the order word in the Order Word Register 3403.

The third circuit arrangement in addition to the Program Address Register 4801 and the Gating Circuits 4805 and 3300 further comprises the Add-One Circuit 4304, 4305, the Auxiliary Storage Register 4812 and the associated gating circuitry (e.g., 4301, 4807, 4813). The third circuit arrangement serves to transmit commands to the Program Store 102 to obtain the next succeeding order word for the Buffer Order Word Register 2410.

A few examples serve to illustrate how the processing capacity is increased by decoding the instruction portion of an order word while it resides in the Buffer Order Word Register 2410, as well as when it resides in the Order Word Register 3403. Order words which specify that information should be read from or written into the data memory (Call Store 103) could not be completed without extending processing time if the addressing of the data memory were not initiated while the order word resides in the Buffer Order Word Register 2410.

In accordance with the invention, the data memory (Call Store 103) is addressed while the order word resides in the Buffer Order Word Register 2410 and the resultant memory reading is returned to the Control Arrangement 101 in time to permit subsequent data processing while the order word, which caused the data memory to be read, resides in the Order Word Register 3403.

Other order words specify that a decision to transfer or to advance should be made in accordance with some previously developed data and, depending upon the decision, further data processing is undertaken or a transfer is made to another program sequence. For example, certain order words specify that data is to be read from the data memory when the decision is to advance. In order to permit the reading of information from the data memory without disrupting the three-cycle overlap, the decision to transfer or to advance is made while the instruction portion of the order word resides in the Buffer Order Word Register 2410. Decoding of the instruction in the Buffer Order Word Register 2410 by the Buffer Order Word Decoder 3902 serves to examine the data specified by what order word and a decision to advance or transfer, based upon that data and the transfer conditions specified by the instruction, is made in sufficient time to permit the data memory to be addressed without disrupting of overlap execution of the successive order words.

A further example, in which processing capacity is increased by decoding the instruction portion of the order word while it resides in the Buffer Order Word Register 2410, is the option which provides for loading the Logic Register 2508 with the data portion of the order word. This is accomplished while the order word resides in the Buffer Order Word Register 2410 and the loading of the Logic Register 2508 is in accordance with output signals of the Buffer Order Word Decoder 3902. While that instruction subsequently resides in the Order Word Register 3403 and is being decoded by the Order Word Decoder 3904, a masking operation, by means of the Mask and Complement Circuit 2000, may be performed under control of output signals of the Order Word Decoder 3904.

The Mixed Decoded 3903 observes the order words in both the Buffer Order Word Register 2410 and the Order Word Register 3403 and resolves conflicts which may occur in the execution of the two successive order words. For example, if the order word in the Buffer Order Word Register 2410 specifies that a particular register within the processor, e.g., XR, YR, ZR, is to be the source register and the instruction in the Order Word Register 3403 specifies the same register to be the destination register, then a race condition may exist. That is, the information may not be available to the destination register at the time this register is to be used as a source register. Consequently, the Mixed Decoder 3903 resolves this conflict by specifying that the information required by the order word which resides in the Buffer Order Word Register 2410 shall be obtained from the Masked Bus 2011 rather than the specified source register.

CENTRAL PROCESSOR (100)

The Central Processor 100 is a centralized data processing facility which comprises three basic elements:

1. Central Control 101;
2. Program Store 102;
3. Call Store 103.

Functionally, the Central Control 101 may be divided into two parts:

1. Basic data processing facilities; and
2. Facilities for communicating with input and output equipment.

In the illustrative embodiment the Central Control 101 executes one order, other than a transfer, a program store data word reading or a variety of work operations which require the use of the special purpose sequence circuits, which are described later herein, per basic 5.5-microsecond instruction cycle, which is the time cycle of the Program Store 102 and of the Call Store 103. A microsecond clock in the Central Control 101 provides one-half microsecond pulses at one-quarter microsecond intervals which pulses permit the central control 101 to perform a series of sequential actions within one basic 5.5-microsecond instruction cycle.

EQUIPMENT DESCRIPTION

The drawing employed herein in many instances shows single lines as the connections between blocks; it is to be understood that single lines are merely symbolic and may indicate numerous connections such as a cable or a bus as previously defined herein.

In certain instances, the binary states of a circuit are provided on a pair of output conductors which are alternatively energized. Such an arrangement is called a two-rail circuit and binary devices which provide individual "0" and "1" state output signals are called two-rail logic elements herein. In other instances, only one of the two states of a binary device is employed as an output signal, and such arrangements are called single rail circuits. Throughout the drawing gates, symbols of amplifiers, et cetera, are understood to be in many cases a plurality of gates or amplifiers comprising a number of channels equal to the number of individual signals to be transmitted therethrough.

PROGRAM STORE (102) [FIG. 2]

Figure 1:
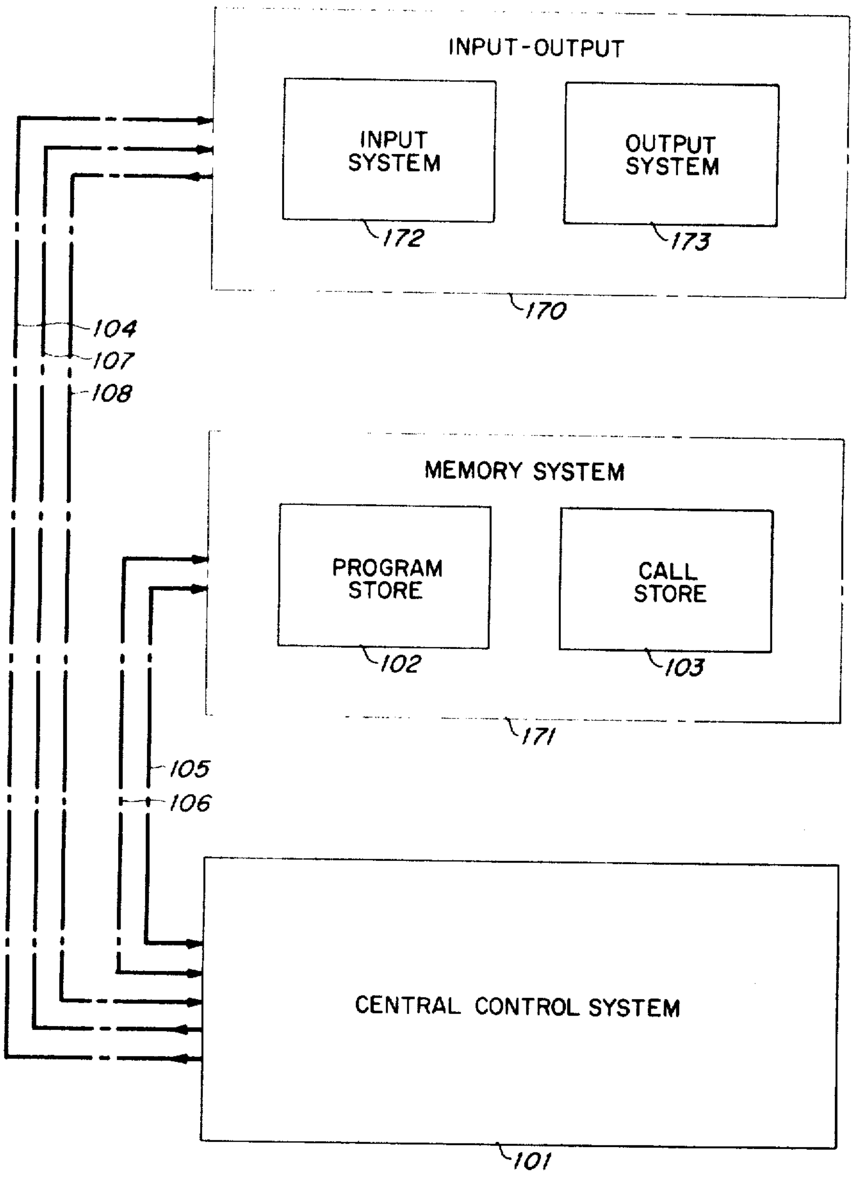
FIG. 1 is a general block diagram of a program-controlled data-processing system.
Figure 10:
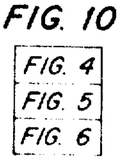
FIG. 10 is a key sheet showing the arrangement of FIGS. 4 through 6.
Figure 2:
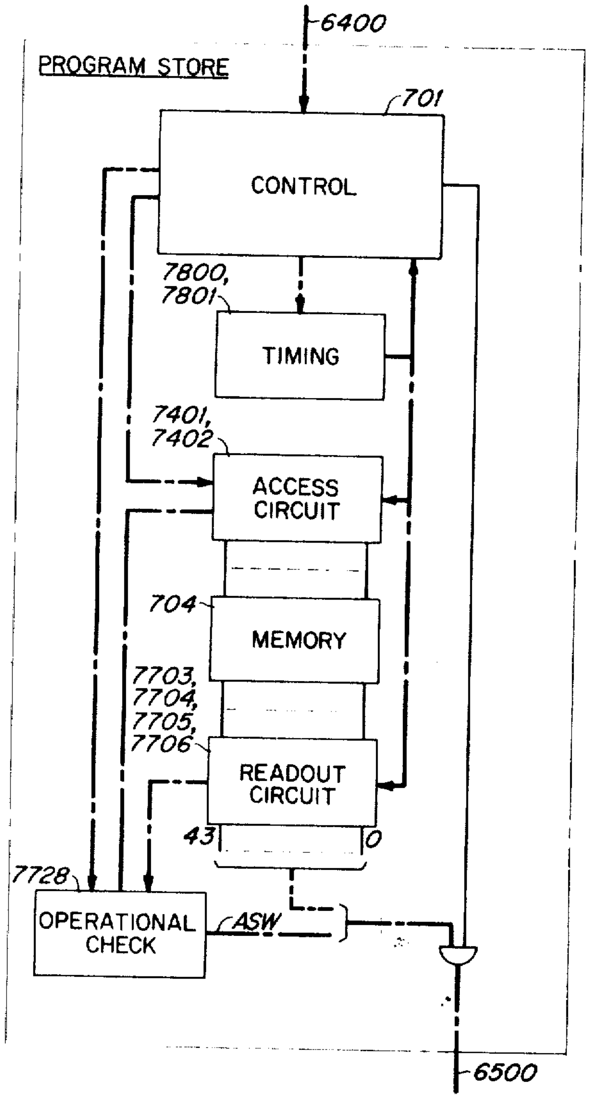
FIG. 2 is a general block diagram of a program store.

The Program Store of the Central Processor comprises a plurality of independent memory units. FIG. 2 is a block diagram of one such independent memory unit.

The Program Store of FIG. 2 is passive in the absence of commands from the Central Control.

In the illustrative embodiment, the Program Store is a permanent magnet magnetic-wire memory (Twistor) which affords nondestructive readout of the information stored therein. The Program Store, being semipermanent in nature, is employed to store certain system data which is changed only at relatively long intervals and the system programs. Information is written into the Program Store by means of the Program Store Card Writer (not shown) under commands from the Central Control 101.

Commands for controlling the Program Store are transmitted from the Central Control to the Program Store via the Bus 6400. The Control 701 responds to commands from the Central Control to: (a) enable the Timing Circuit 7800, 7801 to initiate a memory timing cycle, (b) generate control signals for the Access Circuit 7401, 7402, and (c) generate signals for the Operational Check Circuit 7728. Output signals of the Timing Circuit 7800, 7801 serve to advance the Control 701 through a fixed sequence and to provide gating signals for the Access Circuits 7401, 7402 and for the Readout Circuit 7703 through 7706. The Memory 704 of the Program Store of FIG. 2 comprises a plurality of memory (Twistor) modules not to exceed 16 in number. Each memory module comprises 8,192 44-bit words. The memory words are associated in pairs at 4096 discrete word-pair addresses. The readout circuits 7703 through 7706 have provisions for selecting a chosen 44-bit word of the pair of words which are obtained by addressing one of these discrete word-pair addresses. The Operational Check Circuit 7728 monitors the internal operation of the Program Store of FIG. 2 and generates a check signal (termed an all seems well ASW signal), which is returned to the Central Control along with the information which is read from the memory module. Output signals of the Timing Circuit 7800, 7801, provide gating signals for selectively transmitting information read from the Memory 704 to the Program Store Response Bus 6500.

In summary, an independent Program Store memory unit, such as is shown in FIG. 2, accepts command signals from the Central Control over the Program Store Command Bus 6400 and transmits responses to the Central Control via the Response Bus 6500. The Program Store of FIG. 2, through the Operational Check Circuit 7728, monitors the internal operation of that program store memory unit and generates check signals for transmission to the Central Control along with information read from the Memory 704. The internal operation of a program store unit is in accordance with timing signals generated by the Timing Circuit 7800, 7801 and information is transmitted to the Central Control at times determined by such internally generated timing signals. The timing circuit is arranged to initiate a timing sequence when a command is received from the Central Control.

CALL STORE (103) [FIG. 3]

Figure 3:
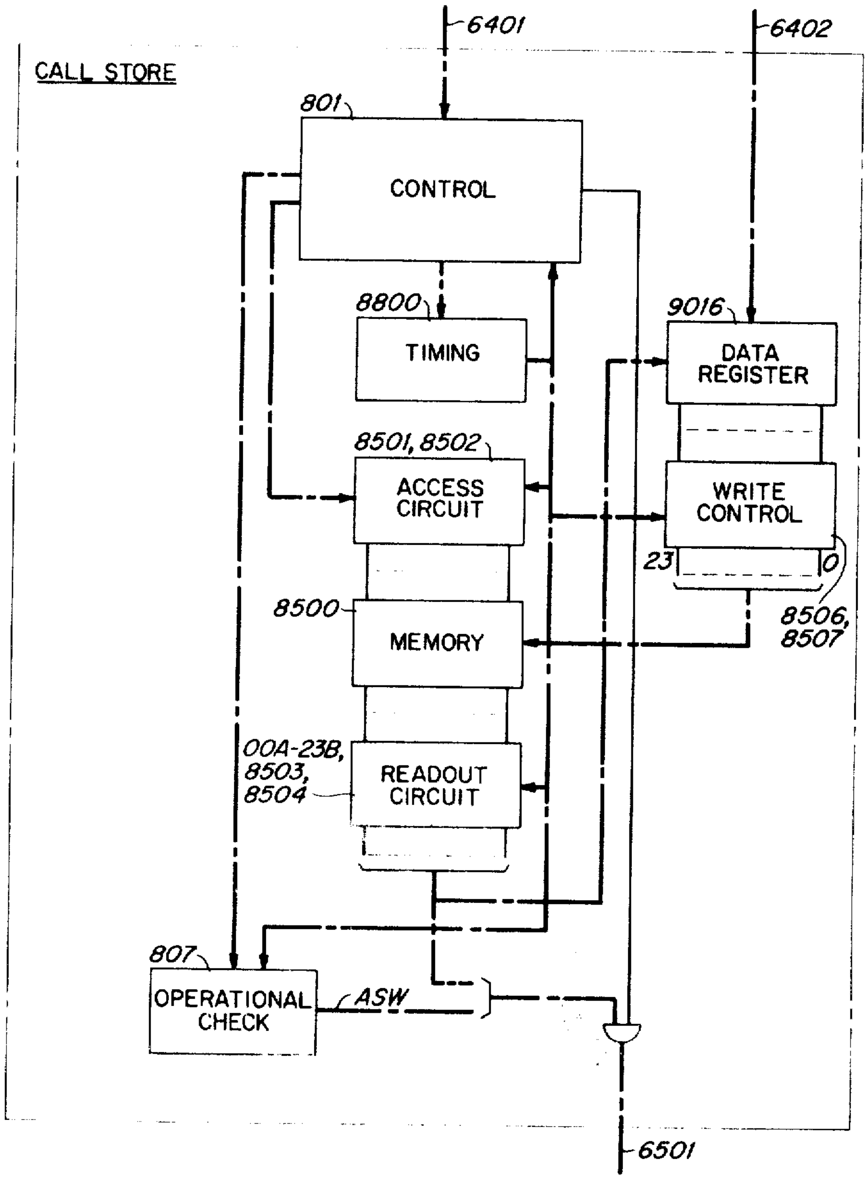
FIG. 3 is a general block diagram of a call store.

The Call Store of the Central Processor comprises a plurality of independent memory units. FIG. 3 is a block diagram of one such independent memory unit.

The Call Store of FIG. 3, like the Program Store of FIG. 2, is passive in the absence of commands from the Central Control.

In the illustrative embodiment, a word organized ferrite sheet memory is employed as the memory element of the Call Store 103. The Call Store of FIG. 3 is a destructive-readout-type memory and information may be read from or written into this memory in a time cycle which corresponds to the time cycle of the Central Control 101. The Call Store, being temporary in nature, is employed to store the system data which is subject to rapid change in the course of processing calls through the system.

Commands for controlling the Call Store are transmitted from the Central Control to the Call Store via the Bus System 6401. Such commands comprise an address defining a location within the Memory 8500 of FIG. 3 and an instruction portion which indicates that the command is to read information from the memory or to write information into the memory. In the case of commands to write information into the memory, the data to be placed in memory is transmitted from the Central Control to the Call Store via the Bus System 6402. The Control 801 responds to commands from the Central Control to: (a) enable the Timing Circuit 8800 to initiate a memory timing cycle, (b) generate control signals for the Access Circuit 8501, 8502 and the Readout Circuit 8503, 8504, (c) enable the Operational Check Circuit 807, and (d) provide control signals for the Output Gates 808. Output signals of the Timing Circuit 8800 serve to advance the Control 801 through a fixed sequence and to provide gating signals for the Access Circuit, the Readout Circuit and the Operational Check Circuit of FIG. 3.

In summary, an independent call store memory unit, such as is shown in FIG. 3, accepts command signals and data from the Central Control over the Call Store Command Bus System 6401 and the Call Store Data Bus System 6402 and transmits responses to the Central Control via the Response Bus System 6501. The Call Store of FIG. 3, through the Operational Check Circuit 807, monitors the internal operation of the call store memory and generates check signals for transmission to the Central Control along with the information read from the Memory 8500. The internal operation of a Call Store unit is in accordance with timing signals generated by the Timing Circuit 8500 and information is transmitted to the Central Control at times determined by such internally generated timing signals. The Timing Circuit 8500 is arranged to initiate a timing sequence when a command is received from the Central Control 101.

CENTRAL CONTROL (101) [FIGS. 4–6]

The central control performs system data processing functions in accordance with program orders which are stored principally in the Program Store 102. In a few specialized instances program orders are found in the Call Store 103. The program orders are arranged within the memories in ordered sequences. The program orders fall into two general classifications, namely, decision orders and nondecision orders.

Decision orders are generally employed to institute desired actions in response to changing conditions either with regard to lines or trunks served by the switching system or changing conditions with respect to the maintenance of the system.

Decision orders dictate that a decision shall be made in accordance with certain observed conditions and the result of the decision causes central control to advance to the next order of the current sequence of order words or to transfer to an order in another sequence of order words. The decision to transfer to another sequence may be coupled with a further determination that the transfer shall be made to a particular one of a plurality of sequences. Decision orders are also termed conditional transfer orders.

Nondecision orders are employed to communicate with units external to Central Control 101 and to both move data from one location to another and to logically process the data in accordance with certain defined instructions. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 101 is arranged to perform certain minor arithmetic functions. The arithmetic functions are generally not concerned with the processing of data but, rather, are primarily employed in the process of fetching new data from the memories such as from the Program Store 102, the Call Store 103, or particular flip-flop registers within the Central Control 101.

The Central Control 101, in response to the order word sequences, processes data and generates and transmits signals for the control of other system units. The control signals which are called commands are selectively transmitted to the Program Store 102, the Call Store 103, and the Input-Output System 170.

A Central Control 101 principally comprises:

A. A plurality of multistage flip-flop registers;

B. A plurality of decoding circuits;

C. A plurality of private-bus systems for communicating between various elements of the central control;

D. A plurality of receiving circuits for accepting input information from a plurality of sources;

E. A plurality of transmitting circuits for transmitting commands and other control signals;

F. A plurality of sequence circuits;

G. Clock sources; and

H. A plurality of gating circuits for combining timing pulses with DC conditions derived within the system.

The Central Control 101 is a synchronous system in the sense that the functions within the Central Control 101 are under the control of a multiphase Microsecond Clock 6100 which provides timing signals for performing all of the logical functions within the system. The timing signals which are derived from the Microsecond Clock 6100 are combined with DC signals from a number of sources in the Order Combining Gate Circuit 3901. The details of the Order Combining Gate Circuit 3901 are not shown in the drawing as the mass of this detail would merely tend to obscure the inventive concepts of this system.

SEQUENCE OF CENTRAL CONTROL OPERATIONS

All of the system functions are accomplished by execution of the sequences of orders which are obtained from the Program Store 102 or the Call Store 103. Each order of a sequence directs Central Control 101 to perform one operational step. An operational step may include several logical operations as set forth above, a decision where specified, and the generation and transmission of commands to other system units.

The Central Control 101 at the times specified by phases of the Microsecond Clock 6100 performs the operational step actions specified by an order. Some of these operational step actions occur simultaneously within Central Control 101, while others are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into one-half microsecond periods which are initiated at one-quarter microsecond intervals.

The basic machine cycle for purposes of designating time is divided into one-quarter microsecond intervals.

The basic machine cycle for purposes of designating time is divided into one-quarter microsecond intervals, and beginning instants of these intervals are labeled T0 through T22. The major phases are labeled Phase 1, Phase 2, and Phase 3. These phases occur in a 5.5-microsecond machine cycle as follows:

A. Phase 1—T0 to T8,

B. Phase 2—T10 to T16,

C. Phase 3—T16 to T22.

For convenience in both the following description and in the drawing, periods of time are designated *bTe* where *b* is the number assigned the instant at which a period of time begins and *e* the number assigned the instant at which a period of time is ended. For example, the statement 10T16 defines phase 20 which begins at time 10 and ends at time 16. The division of time is shown in FIG. 7.

A 2-megacycle Clock Oscillator 6106 drives the Microsecond Clock 6100 which generates output signals as shown in FIG. 7. These output signals are transmitted to the Order-Combining Gate 3901. Further, the Microsecond Clock 6100 provides input signals to the Millisecond Clock 6101 via conductor 6105. These input signals occur once every 5.5 microseconds.

In order to maximize the data-processing capacity of Central Control 101 three-cycle overlap operation is employed. In this mode of operation central control simultaneously performs:

A. The operational step for one instruction;

B. Receives from the Program Store 102 the order for the next operational step; and C. Sends an address to the Program Store 102 for the next succeeding order.

This mode of operation is illustrated in FIG. 8. Three cycle overlap operation is made possible by the provision of both a Buffer Order Word Register 2410, and Order Word Register 3403 and their respective decoders, the Buffer Order Word Decoder 3902 and the Order Word Decoder 3904. A Mixed Decoder 3903 resolves conflicts between the program words in the Order Word Register 3403 and the Buffer Order Word Register 2410. The Auxiliary Buffer Order Word Register 1901 absorbs differences in time of program store response.

The initial gating action signals for the order X (herein designated the indexing cycle) are derived in the Buffer Order Word Decoder 3902 in response to the appearance of order X in the Buffer Order Word Register 2410. The order X is gated to the Order Word Register 3403 (while still being retained in the Buffer Order Word Register 2410 for the indexing cycle) during Phase 3 of cycle 2; upon reaching the Order Word Register 3403 the final gating actions (herein indicated as the execution cycle) for the order X are controlled via Order Word Decoder 3904.

The indexing cycle and the execution cycle are each less than a 5.5-microsecond machine cycle in duration. In the executing of the operational steps of a sequence of orders like those shown in FIG. 8 each order remains in the Order Word Register 3403 and the Buffer Order Word Register 2410 each for one 5.5-microsecond cycle. The Buffer Order Word Decoder 3902 and the Order Word Decoder 3904 are DC combinational circuits; the DC output signals of the decoders are combined with selected microsecond clock pulses (among those indicated in FIG. 7) in the Order-Combining Gate Circuit 3901. This Order-Combining Gate Circuit 3901 thus generates the proper sequences of gating signals to carry out the indexing cycle and the execution cycle of each of the sequence of orders in turn as they appear first in the Buffer Order Word Register 2410 and then in the Order Word Register 3403.

The performance of the operational steps for certain orders requires more time than one operational step period, i.e., more than 5.5 microseconds. This requirement for additional time may be specified directly by the order; however, in other instances this requirement for additional time is imposed by indicated trouble conditions which occur during the execution of an order. Where an order specifies that the execution thereof will require more than one operational step period, the additional processing time for that order may be gained by:

1. Performing the additional data processing during and immediately following the indexing cycle of the order and before the execution cycle of the order; or
2. Performing the additional data processing during and immediately after the normal execution cycle of the order.

The performance of these additional work functions is accomplished by way of a plurality of sequence circuits within Central Control 101. These sequence circuits are hardware configurations which are activated by associated program orders or trouble indications and which serve to extend the time in the operational step beyond the normal operational step period illustrated in FIG. 8. The period of time by which the normal operational step period is extended varies depending upon the amount of additional time required and is not necessarily an integral number of machine cycles. However, the sequences which cause delays in the execution of other orders always cause delays which are an integral number of machine cycles.

The sequence circuits share control of data processing within the Central Control 101 with the decoders, i.e., the Buffer Order Word Decoder 3902 (BOWD), the Order Word Decoder 3904 (BOWD), and the Mixed Decoder 3903 (MXD). In the case of orders in which the additional work functions are performed before the beginning of the execution cycle, the sequence circuit or, as more commonly referred to, the "sequencer" controls the Central Control 101 to the exclusion of decoders BOWD, OWD, and MXD. The exclusion of the decoder controlled gating actions are achieved via the control functions BOWDA, BOWDB, BOWDC, and OWD. Activation of any of the sequencers except the Command Order Sequencer 4902, the K Register Sequencer 5701, and the Emergency Action Sequencer 5702 results in the disappearance of signals on one or more of BOWDA, BOWDB, BOWDC, and OWD during selected intervals of time. BOWDA, BOWDB, and BOWDC are made logical inputs to Buffer Order Word Decoder 3902- and Mixed Decoder 3903-controlled gating functions, and OWD is made a logical input to Order Word Decoder 3904-controlled gating functions. Accordingly the decoder-controlled gating actions are inhibited by the disappearance of signals on BOWDA, BOWDB, BOWDC, and/or OWD when one of the previously noted sequencers is activated. However, in the case of orders in which the additional work functions are performed during and immediately after the execution cycle of the order, the sequencer and the decoders jointly and simultaneously share control of the Central Control 101. In this latter case there are a number of limitations placed on the orders which follow an order which requires the enablement of a sequencer. Such limitations assure that the central control elements which are under the control of the sequencer are not simultaneously under control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within Central Control 101 and with selected clock pulses in the Order-Combining Gate Circuit 3901 to generate gating signals. These signals carry out the required sequence circuit gating actions and cause the counter circuit to advance through its sequence of internal states.

Sequence circuits which extend the period of an operational step by seizing control of a Central Control 101 to the exclusion of the decoders BOWD, OWD, and MXD are arranged to transmit the address of the next succeeding program order word concurrently with the completion of the sequencer gating actions. Thus, although the execution of the order immediately succeeding an order which enabled the sequencer of the above character is delayed, the degree of overlap shown in FIG. 8 is maintained.

Sequence circuits which do not exclude the decoders BOWD, OWD, and MXD provide additional overlap beyond that shown in FIG. 8. That is, the transmission of the address of and acceptance of the order immediately succeeding an order, which enabled a sequencer, are not delayed. The additional gating actions required by such sequence circuits are carried out not only concurrently with the indexing cycle of the immediately succeeding order, but also concurrently with at least a portion of the execution cycle of the immediately succeeding order.

A few examples will serve to illustrate the utility of the sequence circuits. A program order which is employed to read data as opposed to program order words from the Program Store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

When errors occur in the reading of words from the Program Store 102, the Program Store Correct-Reread Sequencer [one of the 1−*N*] is enabled to effect a correction or a rereading of the Program Store 102 at the previously addressed location. This sequence circuit is representative of the type of sequence circuit which is enabled by a trouble indication and which seizes control of the Central Control 101 to the exclusion of the decoders.

The Command Order Sequencer [one of the sequencers 1−*N*] which serves to transmit input-output commands to the Input-Output System and is representative of the sequence circuits which, when enabled, increase the degree of overlap beyond that shown in FIG. 8. That is, the transmission of input-output commands extends into the execution cycle of the order following the network command order.

In the processing of certain multicycle orders a plurality of sequence circuits may be activated so that the processing of the multicycle order may include both kinds of gating actions; first additional gating cycles may be inserted between the indexing cycle and the execution cycle of the order, and then a second sequence circuit may be activated to carry out gating actions which extend the degree of overlap to an additional cycle or cycles.

CENTRAL CONTROL RESPONSES TO PROGRAM ORDER WORDS

FIGS. 4–6, which show the Central Control 101, aid in understanding the basic operational step actions that are performed by Central Control 101 in response to various program order words. Each program order word comprises an operational field, a data-address field, and Hamming error detecting and correcting bits.

The operation field is a 14- or a 16-bit binary word which defines the order and specifies the operational step actions to be performed by the Central Control 101 in response to the order. The operation field is 14 or 16 bits long, depending on the particular order which is defined by the operation field.

There are sets of "options" that may be specified with each of the program order words. The operational step of each order consists of a specific set of gating actions to process data contained in Central Control 101 and/or communicate information between the Central Control 101 and other units in our system. When an option is specified with the program order being executed, additional data processing is included in the operational step. The specific gating actions and the data processing performed for each of the options are described elsewhere herein. Accordingly, a portion of the 14- or 16-bit operation field of a program order word specifies the program order, and the remaining portion of the field may select one or more of the options to be executed.

Certain of the options are compatible with and provide additional data processing for nearly all of the orders. An example of such an option is that of "indexing" in which none or one of seven flip-flop registers within Central Control 101 are selected for additional data processing. In the orders which permit indexing a 3-bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, Central Control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability. This conditional assignment advantageously permits the inclusion of a larger variety of orders and options than could otherwise be included in the 14- to 16-bit operation field.

The data-address field of a program order word is either a 23-bit data word to be placed in a selected flip-flop register in Central Control 101 or a 21-bit word which may be used directly or with indexing to form a code-address for addressing memory. In all order words the sum of the bits of the operation field (16 or 14) plus the bits of the data-address field 21 or 23 is always 37 bits. If the order word has a 16-bit operation field, its data-address field will be 21 bits long; if the operation field is 14 bits long, the data-address is a 23-bit number. The shortened D-A field is utilized to obtain more combinations in the correspondingly lengthened operation field and therefore a larger and more powerful collection of program order words.

The Central Control 101 performs the operational steps for most orders at the rate of one order per 5.5-microsecond cycle. Although such orders are designated single cycle orders, the total time involved in obtaining the order word and the central control responses thereto is in the order of three 5.5-microsecond cycles. The overlap operation previously noted herein permits Central Control 101 to achieve the stated rate of performing one such single cycle order every 5.5 microseconds.

The sequence of gating actions for a typical order, order X, and their relationship to the gating actions for the preceding order, order X−1, and a succeeding order, order X+1, are shown in FIG. 8. As shown on line 2 of FIG. 8, during phase 1 of a 5.5-microsecond cycle that is arbitrarily designated cycle 1, the code and address of program order word X appears in the Program Address Register 4801 (PAR) and is gated to the Program Store 102 via the Program Store Address Bus 6400. The code and address is interpreted by the Program Store 102 and the order word X is returned to central control over the Program Store Response Bus 6500 sometime during phase 3 of cycle 1 or phase 1 of cycle 2. The operation field portion of the program order word is gated into the Auxiliary Buffer Order Word Register 1901 (ABOWR), and the data-address field, and the Hamming bits of the order word are gated into the Buffer Order Word Register 2401 (BOWR).

The operation field is first gated into the Auxiliary Buffer Order Word Register 1901 (ABOWR) since it is possible that the program order word which is returned from the Program Store 102 reaches Central Control 101 prior to completion of the gating actions by the Buffer Order Word Decoder 3902 (BOWD) on the preceding order word, in this case order word X−1. This may be seen by reference to FIG. 8 where in the line labeled X−1, the gating directed by the Buffer Order Word Decoder 3902 (BOWD) for the order word X−1 is completed at the end of phase 3 of cycle 1; and, as shown in the line labeled X, the program order word X may reach central control in the latter portion of phase 3 of cycle 1. The Auxiliary Buffer Order Word Register 1901 (ABOWR) resolves this conflict. The same situation does not obtain with respect to either the Hamming encoding bits or the data-address word as by the end of phase 2 of cycle 1 all of the actions with respect to both the Hamming encoding bits and the data-address bits for the order X−1 have been completed.

The time at which a program order word reaches the Central Control 101 is subject to variation as a result of a number of factors. For example, since there are two central controls and a number of program stores, the physical distance between a particular central control and each of the program stores is different and this difference is reflected in both the Program Store Address Bus 6400 and in the Program Store Response Bus 6500. Further, there may be differences in the response times of the various program stores and their access circuits and these variations may be cumulative with the differences in bus lengths.

The decoded outputs of the Buffer Order Word Decoder 3902 (BOWD) are combined with selected clock pulses from the Microsecond Clock 6100 (CLK) in the Order-Combining Gate Circuit 3901 (OCG) which operates selected gates within Central Control 101 in the proper time sequence during phase 2 and phase 3 of the second cycle to perform indexing, index modification, and certain other gating actions with respect to order X.

During phase 3 of the second cycle the operation field of order X (FIG. 8) is gated from the Buffer Order Word Register 2410 (BOWR) to the Order Word Register 3403 (OWR). The Order Word Decoder 3904 (OWD) decodes the operation field of the order X which is in the Order Word Register 3403 (OWR) for the performance of the remaining gating actions. DC output signals from the Order Word Decoder 3904 (OWD) are combined with selected pulses from the Microsecond Clock 6100 (CLK) in the Order-Combining Gate 3901 (OCG) to complete the gating actions of the single cycle order X during phase 1 and phase 2 of the third cycle.

During phase 2 of the third cycle order X is completing its last gating action from the Order Word Register 3403 (OWR) and the Order Word Decoder 3904 (OWD), and order X+1 is simultaneously performing the indexing step from the Buffer Order Word Register 2410 (BOWR) and the Buffer Order Word Decoder 3902 (BOWD). Since the simultaneous gating actions may conflict in the use of the flip-flop registers such as XR, YR, ZR, et cetera, the Mixed Decoder 3903 (MXD) decodes the contents of both the Buffer Order Word Register 2410 (BOWR) and the Order Word Register 3403 (OWR). The Mixed Decoder 3903 (MXD) outputs, which are DC signals, are combined with the outputs of the Buffer Order Word Decoder 3902 (BOWD) in the Order Combining Gates 3901 (OCG) to modify gating actions so as to resolve conflicts in the two operational steps.

A conflict which is resolved by the Mixed Decoder 3903 may arise when a memory reading order is followed by a next succeeding order word which employs indexing. In the execution of two such successive order words information is normally gated from the Buffer Register 2106 to a selected destination index register via the Masked Bus 2011, while at the same time data for indexing is being transmitted from a selected source index register to the Augend Register 2908 of the index adder system via the Unmasked Bus 2014. However, where these two successive orders specify the same index register as a destination register for the memory reading and as a source register for the indexing data, there is insufficient time to complete the transfer of the information to the destination register and from there to the augend register; therefore, the Mixed Decoder 3903 in these instances transfers the desired information from the Masked Bus 2011 directly to the Augend Register 2908 at the same time that this information is being transmitted to the specified destination index register.

MASK AND COMPLEMENT CIRCUIT 2000 (M&C)

The internal data processing structure is built around two multiconductor buses, the Unmasked Bus 2014 (UB) and the Masked Bus 2011 (MB), which provide a link for moving a multibit word of data from one of a specific group of flip-flop registers to another. This group consists of the Index Registers 2601 (BR), 5801 (FR), 5802 (JR), 4001 (KR), 2501 (XR), 3001 (YR), and 3002 (ZR) and the Logic Register 2508 (LR).

The Mask and Complement Circuit 2000 (M&C) connects the Unmasked Bus 2014 to the Masked Bus 2011 and provides means for logically operating upon the data as it passes from the Unmasked Bus 2014 to the Masked Bus 2011. The logical operation to be performed, product masking (AND), union masking (OR), exclusive OR masking (EXCLUSIVE-OR), and complementing is prescribed by the operation field of the program order as decoded by either the Buffer Order Word Decoder BOWD or the Order Word Decoder OWD. Only one masking operation may be performed in a single pass of data through the circuit M&C; however, the masking operation may be followed by a complementing operation in gating data through the circuit M&C. Each of the masking operations requires two operands and the contents of the Logic Register LR always comprises one of the operands.

The Mask and Complement Circuit M&C 2000 also provides a convenient means for connecting the Data Buffer Register 2601 and the Index Adder Output Register 3401 to the Masked Bus 2011. The data word which appears at one of the input AND-gates 2001–2003 of the Mask and Complement Circuit 2000 may be selectively gated directly to the Masked Bus 2011 without alteration or may be masked and/or complemented during transmission through the mask and complement circuit. The AND-OR Circuit 2005 serves to Union mask or Product mask the input data word when enabled by order cable signals on conductors 20UMASK and 20PMASK, respectively. The word appearing at the output of the AND-OR Circuit 2005 may be complemented in the Complement Circuit 2006 by enabling order cable conductor 20COMP or may be transmitted directly to the Masked Bus 2011 by enabling order cable conductor 20MPASS.

The input data word may be gated directly to the Masked Bus 2011 by enabling AND-gate 2012 by an order cable signal on conductor 20PASS or may be complemented in the Complement Circuit 2007 by enabling order cable conductor 20COMP.

Exclusive OR masking may be achieved in the EXCLUSIVE-OR Circuit 2008 by enabling order cable conductor 20XMASK. It should be noted that it is not possible to complement the data word appearing at the output of the EXCLUSIVE-OR Circuit 2008.

K REGISTER 4001 (KR); K LOGIC (KLOG);

Detect First-One Circuit 5415 (DFO)

The K-Register KR, the K-Logic (KLOG), and the Detect First-One Circuit 5415 (DFO) provide a second major internal data processing facility. The K-Logic (KLOG) comprises input and output circuitry surrounding the K-Register 4001. The K-Logic (KLOG) includes the KA Input Register 3502, the KB Input Register 3504, the K-Input Logic 3505, the K-Logic Homogeneity Circuit 4502; and at the output of the K-Register 4001 the Rotate Shift Circuit 4500 and the K-Register Homogeneity Circuit 4503. The K-Logic (KLOG) may be directed by output signals of the Order-Combining Gate OCG to perform one of four logical operations on two operands. One operand is the content of the K-Register KR; the other is the information on the Masked Bus MB. The Order Word Decoder OWD and the K-Register Sequence Circuit (part of SEQ) generate signals which cause the K-Logic (KLOG) to combine the two operands in the operations of AND, OR, EXCLUSIVE-OR, or ADDITION. The word resulting from the logical combination, according to the order in the Order Word Register 3403, may either be gated to the K-Register KR or to the Control Homogeneity Circuit 5020 and the Control Sign Circuit 5413.

A word appearing on the Masked Bus 2011 may in some instances be gated directly to the K-Register 4001 via the K-Input Logic 3505. The K-Register 4001 may thereby be employed as a simple destination register for data like other flip-flop registers in central control such as XR, YR ZR, etc.

In carrying out the ADDITION operation in the K-Input Logic 3505 the two operands are treated as 22-bit signed numbers. The 23rd bit of each operand is the sign bit. If this bit has the value 0 the number is positive, and the magnitude of the number is given by the remaining 22 bits. If the sign bit is 1 the number is negative, and the magnitude of the number is given by the one's complement of the remaining 22 bits. (The magnitude is determined by inverting each bit of the 22 bit number.) The add circuit [not shown] within K-Logic 3505 can correctly add any combination of positive and negative operands as long as the magnitude of the algebraic sum of the two operands is equal to or less than $2^{22}-1$.

The K-Input Logic (3505) and the K-Register 4001 can perform other logical operations on the contents of the K-Register 4001. One of these operations is given the name "SHIFT." The gating action performed by SHIFT is based, in part, on the least-significant 6 bits of the number that appears in the Index Adder IA at the time the shift is to be performed. The least significant 5 bits constitute a number that indicates the magnitude of the shift, and the 6th bit determines the direction of the shift. A 0 in the sixth bit is interpreted as a shift to the left, and the remaining 5 bits indicate the magnitude of this shift. A 1 in the 6th bit is interpreted as a shift to the right, and the one's complement of the remaining 5 bits indicates the magnitude of the shift to the right. Although in shifts to the right the least significant five bits contain the one's complement of the magnitude of the shift, the 6-bit number will be referred to hereafter as comprising a sign and a magnitude.

A logical operation similar to the shift is the operation "ROTATE." As in shifting, the 6 bits of the Index Adder IA are treated as a direction and magnitude for the rotation just as described for the shift.

A rotate of one to the left is identical to a shift of one to the left except for the gating of the flip-flops at each end of the K-Register 4001. In a rotation of one to the left the content of bit 22 is not lost as in the shift but instead replaces the content of the least significant zero bit of the K-Register 4001. A rotate of two to the left is identical to two rotates of one to the left in succession, a rotate of three to the left is identical to three rotates of one to the left, etc. A rotate of 23 to the left has the same effect on the K-Register 4001 as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K-Register 4001.

A complement option may be employed with shift and rotate orders and, where specified, the significance of the sign bit is inverted, that is, where the complement option is specified a 0 in the sixth bit is interpreted as a shift to the right while a 1 in the sixth bit is interpreted as a shift to the left.

A special purpose rotate order applies rotation to only bits 6 through 21 of the K-Register 4001 and leaves the remaining positions of the K-Register 4001 unchanged.

Another logical gating action is the determination of the rightmost one in the contents of the K-Register 4001. This action is accomplished by gating the contents of the Detect First-One Circuit 5415 to the F-Register 5801 via the Unmasked Bus 2014, the Mask and Complement Circuit 2000, and the Masked Bus 2011. The number gated is a 5-bit binary number corresponding to the first stage (reading from the right) in the K-Register 4001 which contains a 1. If the least significant bit of the K-Register 4001 contains a 1, 0 is the number gated to the F-Register 5801. If the first 1 reading from the right is in the next position, 1 is the number gated to the F-Register 5801. If the only 1 appearing in the K-Register is in the most significant position, 22 is the number gated to the F-Register 5801. If the K-Register contains no 1's, then nothing is gated to the F-Register 5801.

INDEX ADDER 3407

A third major data processing configuration within the Central Control 101 is the Index Adder 3407 which is used to:

1. Form a quantity designated herein as the indexed DAR word consisting of the sum of the D-A field of the program order word being executed and the contents of an index register specified in an order, or
2. To perform the task of a general purpose adder; the operands in this latter instance may be the contents of two index registers or the D-A field and the contents of an index register.

The outputs of the Index Adder 3407 are selectively connected to the Program Address Register 4801, the Memory Address Decoder 3905, and the Call Store Address Bus System 6401 when employed for indexing; the outputs of the adder may also be connected to the Masked Bus 2011 via the Mask and Complement Circuit 2000 when employed as a general purpose adder. Access to the Masked Bus 2011 permits the word formed to be employed for a number of purposes, for example:

1. Data to be placed in the K-Register 4001 without modification or to be combined with the contents of the K-Register 4001 in the K-Input Logic 3505;
2. A number for determining the magnitude and direction of a shift or rotate;
3. Data to be placed in a specified index register;
4. Data to be transmitted over the Command Bus 6406 via the K-Logic 3505 and the Command Translator 3509;
5. Data to be sent to the Central Pulse Distributor (part of the output system) via the F-Register 5801 and the Central Pulse Distributor Translator 5422.

Indexing is the adding of two numbers in the Index Adder 3407. The D-A field of the order as it appears in the Buffer Order Word Register 2410 is one operand used in indexing and the other operand, if required, is the contents of one of the seven Index Registers BR, FR, JR, KR, XR, YR, and ZR. For orders which include the indexing option a 3-bit number within the operation field specifies either (1) no indexing, or (2) indexing on one of the seven flip-flop registers according to the following table.

| X34 | X33 | X32 | Register |
|---|---|---|---|
| 0 | 0 | 0 | No register |
| 0 | 0 | 1 | 9BR |
| 0 | 1 | 0 | 9FR |
| 0 | 1 | 1 | 9JR |
| 1 | 0 | 0 | 9KR |
| 1 | 0 | 1 | 9XR |
| 1 | 1 | 0 | 9YR |
| 1 | 1 | 1 | 9ZR |

If no register is specified for indexing, then only the D-A field is gated to the Index Adder 3407 and the output of the Index Adder 3407 will be the D-A field (the sum of the D-A field and 0.) If an index register is specified, the contents thereof are normally gated onto the Unmasked Bus 2014 and from there directly into the Index Adder 3407.

If the order X specifies indexing, and if the index constant is obtained by a memory reading operation of the preceding order X−1, then the Mixed Decoder 3903 substitutes the Masked Bus 2011 for the index register. The Mixed Decoder 3903 insures that the Index Adder 3407 always has the correct operands to perform the timely addition to complete the operational step for order X.

A number of the orders have as an option specified by a combination of bits in the operation field the loading of the D-A field into the Logic Register 2508. This option permits the placing of specified new data into the Logic Register 2508 for use in subsequent masking operations. If the D-A field is used to load the Logic Register 2508, then it is considered not available for indexing and the only operand gated to the Index Adder 3407 is the contents of a specified index register.

The sum appearing at the output of the Index Adder 3407 is referred to as the DAR address or word. If indexing is not specified in an order, the DAR address or word is the D-A field of that order. If indexing is specified and the D-A field is not gated to the Logic Register 2508, the DAR address or word will be the sum of the D-A field and the contents of the specified index register. If the D-A field is used for loading the Logic Register 2508, the DAR will be the contents of the specified index register.

The Index Adder 3407, as well as the add circuit within the K Input Logic 3505, utilizes one's complement binary arithmetic. All inputs of the index adder are treated as 22-bit numbers with the 23rd bit a sign bit. A positive number is indicated by a 0 in the 23rd bit and a negative number by a 1 in the 23rd bit. End-around-carry is provided so that the Index Adder 3407 can correctly handle all four combinations of positive and negative operands as long as the algebraic sum of the two operands does not exceed $2^{22}-1$.

Some orders, as previously mentioned, have a 23-bit D-A field, and others have a 21-bit D-A field. If the D-A field is only 21 bits long, then the 21st bit is treated as the sign bit; this bit is expanded to also become the 22nd and 23rd bits of the effective D-A field gated to the Index Adder 3407. Expansion converts a 21-bit D-A field to an effective 23-bit D-A field for indexing. Expansion preserves the end-around-carry for indexing with 21-bit D-A fields.

DECISION LOGIC 3906 (DECL)

The Central Control 101 in the execution of a decision order in a sequence of orders either continues with the current sequence of orders or transfers to a new sequence of orders. The decision is made by the Decision Logic 3906 (DECL) in accordance with the order being processed. The order specifies the information to be examined and the basis for the decision. The information may be obtained from the Control Homogeneity Flip-Flop 5020 of the Control Homogeneity Circuit CH, the Control Sign Flip-Flop 5413 of the Control Sign Circuit CS or selected outputs of the K-Register 4001. The basis of the decision may be that the information examined is (or is not) arithmetic zero, less than 0, greater than 0, etc. A decision to advance does not disturb the current sequence of obtaining and executing orders. A decision to transfer to a new sequence of orders is coupled in accordance with the particular word being executed to a determination of whether the transfer is an "early transfer" or a "late transfer." Accordingly, if the decision is made to transfer, either the early transfer conductor ETR or the late transfer conductor LTR will be energized and thereby activate the Transfer Sequencer 4401. The Transfer Sequencer 4401 inserts the necessary additional cycles to gate the transfer code-address to the Program Address Register 4801 and inhibits the outputs of the decoders 3902–3904 until the first program order word of the new sequence has been placed in the Buffer Order Word Register 2410. The transfer address may be obtained from a number of sources and the source is indicated by the order being executed. In the case of early transfer orders, the transfer address comprises the contents of a preselected one of the J-Register 5802 or the Z-Register 3002. In the case of late transfer orders, the transfer address may be obtained directly, in which case the DAR code-address which is formed in the index adder is employed, or indirectly, in which case the transfer address comprises a memory reading at the location specified by the DAR code-address which is formed in the Index Adder 3407. This latter case is referred to herein as indirect addressing.

The distinction between early transfer and late transfer orders is based on whether or not the decision order requires a memory reading or writing in the event of an advance. A decision order which requires a memory to be read or written into after a decision to advance is an early transfer order. If the decision on such an early transfer order is to advance, then the memory reading or writing operation is carried out as a normal gating action under control of the Buffer Order Word Decoder 3902 and the Order Word Decoder 3904. However, if the decision is to transfer, the decision is advantageously made early to inhibit the gating associated with the memory reading or writing operation. The inhibiting of the decoders 3902–3904 by the Transfer Sequencer 4401 serves to prevent the response of Central Control 101 to the advance order when the decision is made to transfer. It also serves to inhibit further decoder controlled gating actions associated with combined transfer orders. For example, when the execution of the order TZRFU, a combined transfer order, results in a transfer, the gating actions of "finding the rightmost one" as defined by the operation portion of the order, are not to be performed; the inhibiting of the Order Word Decoder 3904 serves to forestall this alternative work operation. Other examples may be seen in early transfer orders. The Transfer Sequencer 4401 is activated early to provide the timely inhibit of the Buffer Order Word Decoder 3902 in such instances.

Other transfer orders which do not require a memory reading operation but which do require extensive data processing prior to making the decision are termed late transfer orders. These orders cannot employ the early transfer timing sequence in that the data processing operations required thereby are not necessarily completed by the time the early transfer signal would be generated. There exists a class of late transfer orders, called "combined" transfer orders, which perform additional data processing whenever the decision is made to advance in the execution of these orders.

Two input information sources for the decision logic comprise the output signals of the control homogeneity flip-flop and the control sign flip-flop which are employed to register homogeneity and sign information which is obtained from a number of locations. For example, a 23-bit data word appearing on the Masked Bus 2011 may be transmitted to the Control Homogeneity Circuit CH. If the data word comprises either all 0's or all 1's, the Control Homogeneity Flip-Flop 5020 will be set to its 1 state, otherwise the flip-flop will be reset. The Control Sign Circuit CS serves to retain the sign of the data word; the Control Sign Flip-Flop 5413 is set if the word is negative and is reset if the word is positive.

The Control Homogeneity Circuit CH and the Control Sign Circuit CS are utilized by some decision orders by gating the output of a selected index register onto the Unmasked Bus 2014, through the Mask and Complement Circuit 2000, onto the Masked Bus 2011, and from there into the Control Homogeneity Circuit CH and the Control Sign Circuit CS. The contents of one of the seven index registers specified in the decision order being processed are thereby summarized in the Control Homogeneity Flip-Flop 5020 and Control Sign Flip-Flop 5413. Further gating actions associated with a decision order carry out the transfer or advance according to the output of the Decision Logic 3906.

Similar homogeneity 4503 and sign circuits provide facilities for a class of decision orders which transfer or advance according to combinations of the homogeneity and sign of 23-bit words contained in the K-Register 4001.

COMMUNICATION BETWEEN THE CENTRAL CONTROL 101 AND CONNECTING UNITS

A second basic function of Central Control 101 is the communication between itself and various other units such as the various memories within the Central Processor 100 and the Input-Output System 170. Communication is accomplished by way of the various bus systems 104–108 and logic circuits which are located in both Central Control 101 and the connecting units.

This communication consists of three general classes. The first class comprises the obtaining of program order words which determine the sequence of actions within Central Control 101. Program order words are primarily obtained from the Program Store 102; however, in special instances program order words for limited actions may be obtained from a Call Store 103. The second class comprises the obtaining of data (excluding program order words) from the memory units within the Central Processor 100, and the third class comprises the generation and transmission of commands to the Input-Output System 170.

The several memories within the Central Processor 100, namely the Program Store 102, the Call Store 103, the Auxiliary Buffer Registers (ABR-1...ABR-N [FIG. 4]), and certain other special locations within Central Control 101 are treated as a memory unit and distinct blocks of addresses are individually assigned to each of the memories. There are a number of memory orders which are employed to selectively obtain information from the above memories and to place this information in selected registers within Central Control 101; these are memory reading orders. There are other memory orders which are employed to selectively transmit data from designated registers within Central Control 101 to one of the above memories; these are memory writing orders. The order structure is thus simplified since access to all of the above-mentioned memory locations is by way of a single-memory address format.

A memory code-address within Central Control 101 always comprises a 20-bit word consisting of:

1. A code to define a block of information; and
2. An address within the specified block.

The code and the address each vary in length according to the memory unit addressed. For example, the codes for specifying information blocks in the program store are four bits long, and the corresponding address is 16 bits long; the codes for specifying information blocks in the Call Store 103 are eight bits long and are accompanied by 12-bit addresses. However, as will be seen later, the code-address which is transmitted to the Call Store 103 comprises an 18-bit portion of the word, namely a 6-bit code and a 12-bit address.

PROGRAM ORDER WORDS

The communication between the Central Control 101 and the Program Store 102 to obtain program order words may be understood with reference to FIGS. 4–6. The Program Address Register 4801 (PAR FIG. 6) and the Auxiliary Storage Register 4812 (ASR FIG. 6) are selectively employed in transmitting commands to the Program Store 102. The Program Address Register 4801 is employed in the absence of uncorrectable program store reading errors. The Auxiliary Storage Register 4812 is employed whenever a Program Store 102 must be reread. When a command is transmitted from the Program Address Register 4801 to the Program Store Address-Bus-System 6400 the code-address of the command is also transmitted to the Auxiliary Storage Register 4812. The Auxiliary Storage Register 4812 thus serves to temporarily hold the code-address which is employed in the performance of Hamming error checks. These checks are applied simultaneously to the order returned and the address employed in obtaining the order. Commands to the Program Store 102 to read information from the memory proper as opposed to test points within the memory access and control circuitry comprise 25 bits as follows:

A. 16 address bits AO through A15,
B. Four code bits KO through K3,
C. Four mode bits CM, HM, GM, CRW,
D. a single synchronizing bit SYNC. The code bits KO through K3 define the block of information in which the selected program store word is located and the address bits AO through A15 define the memory location within the above defined block of information. The four mode bits specify the mode of operation of the program stores.

The code and address portions of the program store commands are obtained from the Program Address Register 4801 or the Auxiliary Storage Register 4812 and the four mode bits and the synchronizing bit are obtained from the Order Cable 3900.

The information required to define the code-address of a program store command is transmitted to the Program Address Register 4801 by one of three possible paths, the chosen path being determined by the sequence of events which lead to the determination of the desired address and code. The desired code-address is selectively obtained by one of the following methods:

A. In the course of executing a sequence of program order words and in the absence of a transfer decision, the code-address of the next order word in the sequence is obtained by incrementing the code-address of the preceding order word by a count of 1. This incrementing function is accomplished by means of the Add-One Register 4304 and the Add-One Logic 4305. The contents of the Program Address Register 4801 are transmitted via AND gate 4301 to the Add-One Register 4304 at time OT2. The code-address in the Add-One Register 4304 comprises the input to the Add-One Logic 4305 which when enabled by signals on conductor INCR [FIG. 6] serves to increment the input word by a count of 1. The output of the AddeOne Logic 4305 is gated to the Program Address Register 4801 via AND-gate 4807 at time 3T5.

From the above sequence it is seen that a very small portion of the 5.5-microsecond operational step cycle is employed in incrementing the address in the Program Address Register 4801. That is, the total time required to increment the address and to return the incremented address to the PAR 4801 is the period of time OT5. Completion of address incrementing in this period of time frees the Add-One Register 4304 and the Add-One Logic 4305 to permit their use for other work functions during the remainder of the cycle. The Add-One Register 4304 and the Add-One Logic 4305 are arranged to operate with 23-bit words for these other work functions.

B. The second source of program store code-address words is the Index Adder Output Register 3401. The Index Adder Output Register 3401 is provided to store the DAR word as described earlier herein. The contents of the Index Adder Output Register 3401 are transmitted via cable 3402, AND gate 4307, to the Program Address Register 4801.

C. The third source of code-address information is the Masked Bus 2011, the contents of which are gated to the Program Address Register 4801 via AND gate 4308, at time 3T5. This path is employed in the case of interrupts to gate code-address words to the Program Address Register 4801 from the Interrupt Address Source 3411 and is also employed on early transfer orders to gate the contents of the J-Register 5802 or the Z-Register 3002 to the Program Address Register 4801.

The transmittal of commands from the Central Control 101 to the Program Store 102 and the transmittal of the program store responses to the Central Control 101 may be understood by reference to FIG. 8. In FIG. 8 the three horizontal lines represent functions which occur with respect to arbitrary orders X−1, X, and X+1, respectively. A machine cycle, as employed in the time scale of this figure, comprises a 5.5-microsecond period of time. A portion of an arbitrary cycle 1 and all of the following cycles 2 and 3 are shown. As seen in FIG. 8, the period of time between the transmission of the command to the Program Store 102 and the completion of the operational step associated with that command require greater than one 5.5-microsecond machine cycle. However, also as seen in FIG. 8, there are work functions relating to three separate orders being simultaneously performed; therefore, it is possible to complete single cycle orders at the rate of one order per 5.5-microsecond cycle.

At line X of FIG. 8 the code-address of order X is shown as being transmitted to the Program Store 102 during phase 1 of cycle 1 and the program store response thereto returned to the Central Control 101 sometime during the latter portion of cycle 1 or the early portion of cycle 2. The program store response comprises parallel one-half microsecond pulses which represent the 44-bit program order word, the response synchronizing signal and the All-Seems-Well signal.

The exact time at which the program store response arrives at the Central Control 101 depends on central control response times, the lengths of the buses connecting the Central Control 101 and the Program Store 102 and the variations in the response times of the program stores of the Program Store System 102. These variations can result in the program store response arriving at the Central Control 101 as early as T19 of the same cycle in which the program store command was transmitted or as late as T6 of the following cycle. Accordingly, the Program Store Response Bus Selection Gates 1200 are activated by order cable signals in the period 19T8. This assures the acceptance of the full pulse width (approximately 0.5 microseconds) of the program store response.

The 44-bit response word is transmitted to the Auxiliary Buffer Order Word Register 1901 and the Buffer Order Word Register 2410. Bits 0 through 20 (the data-address field) and bits 37 through 43 (the Hamming encoding bits) are gated directly into the Buffer Order Word Register 2410. Bits 21 through 36 (the operation field) are inserted into the Auxiliary Buffer Order Word Register 1901.

The data-address field and the Hamming encoding bits are gated directly to the Buffer Order Word Register 2410 as the portions of the register which are employed to store this information are no longer required by the immediately preceding order; however, the work operations with respect to the operation field of the preceding order may not have been completed by the time the program store response has arrived at the Central Control 101. Therefore the operation field is first inserted into the Auxiliary Buffer Order Word Register 1901 and then at time 6T8 to the Buffer Order Word Register 2410.

The information which is received both by the Auxiliary Buffer Order Word Register 1901 and the Buffer Order Word Register 2410 is on a single rail basis; therefore, both the Auxiliary Buffer Order Word Register 1901 and all of the portions 2401, 2402, 2403 of the Buffer Order Word Register 2410 are selectively reset prior to the time of the inserting of new information.

DATA WORDS

As previously described, a large body of information organized as data words as opposed to program order words is stored principally in the Call Store 103 and the Program Store 102. The more volatile information is stored principally in the Call Store 103, while the more stable information is stored in the Program Store 102. Additionally, maintenance data which is stored internally in the control and access circuits of the Program Store 102, the Call Store 103, and the standby central control is treated as data for purposes of communication.

Data words may be read from a memory location or written into a memory location by the execution of program orders termed "memory orders." Included in this term are "memory read orders" and "memory write orders." Memory orders cause the generation and transmission of commands to the various memory locations as follows:

| Memory | Read Command | Write Command |
|---|---|---|
| Call Store 103 | | |
| Memory Proper | X | X |
| Control and access | X | X |
| Program Store 102 | | |
| Memory Proper | X | |
| Control and access | X | X |
| Standby Central Control 101 | | |
| X | | |
| Auxiliary Buffer Registers | X | X |

The above table shows that both memory read and memory write commands apply to many of the data memories; however, memory write commands cannot be employed with respect to the memory proper of the Program Store 102 nor can memory read commands be employed with respect to the standby Central Control 101.

CALL STORE MEMORY ORDERS

Memory reading (writing) orders which obtain (store) data from the Call Store 103 include call store reading (writing) commands as part of their operational step. The operational step of such orders is indicated by the example of order X in FIG. 8; in that example call store commands are generated and transmitted during phase 3 of the indexing cycle. If X is a memory reading order, the call store response will be transmitted from the Call Store 103 to the Data Buffer Register 2601 during phase 1 of the execution cycle; if X is a memory writing order, the word to be stored is transmitted from the Data Buffer Register 2601 to the Call Store 103 during phase 1 of the execution cycle. Call store commands are also generated for multicycle orders under control of sequence circuits, but the command and data generation and transmission have the same format and relative time sequence as described below.

A call store command comprises:

A. 12 address bits A0 through A11
B. Six code bits K0 through K5
C. Three mode bits HM, GM, CM
D. A first synchronizing bit Sync 1
E. Two order bits R and W
F. One address parity bit
G. A second synchronizing bit Sync 2.

The code bits K0 through K5 define the block of information in which the selected call store data word is located and the address bits A0 through A11 define the memory location within the above defined block of information. The code bits K0 through K5 and the address bits A0 through A11 comprise the call store code-address. The three mode bits specify the mode of operation of the Call Store 103 and the order bits specify whether the command is to read or write.

Pulses on the R and W conductors specify that the order is a call store read command or a call store write command, respectively.

The twelve address bits A0 through A11, the six code bits K0 through K5, and the address parity it comprise a 19-bit segment of the command in which odd parity is maintained.

The first synchronizing signal Sync 1 accompanies the address, code, and the mode bits and the second synchronizing signal Sync 2 accompanies the information on the R, W, and parity conductors. The synchronizing pulse S1 and S2 are employed as gating signals at the Call Store 103 and serve to reduce the time during which the Call Store 103 is vulnerable to noise signals on its command buses.

The execution of memory orders by Central Control 101 to move data words between the Call Store 103 and the Central Control 101 is initiated by the transmission of call store commands from Central Control 101 to the Call Store 103 via the Call Store Address-Bus System 6401. If the command is to write a data word into the Call Store 103, then the command is followed by the transmission of the data word via the Call Store Write Data-Bus System 6402. If the command is to read a data word, then the call store read command is followed by the transmission of the data word from the Call Store 103 to Central Control 101 via the Call Store Response-Bus System 6501.

In executing a call store command the code-address is always composed in the Index Adder Output Register 3401 which is connected to the Call Store Transmit-Bus-Selection Gates 1000 via the cable 3402. Bits 17 through 12 of the index adder output register comprise the code portion of the command and bits 11 through 0 comprise the address portion of the command. The three mode bits, the synchronizing bits, and the read-write bits are all obtained from the Order Cable 3900. The three mode bits are required to be selectively other than 0 in all modes other than the normal mode and in these modes the mode bits are defined by the program order word being executed. In all mode of operation the read and write bits and the synchronizing bits are also obtained from the Order Cable 3900 according to the call store command required.

The parity signal generated as part of the call store command is generated in the Index Adder Parity Generator 2415 in response to the code-address appearing at the outputs of the Index Adder Output Register 3401.

CALL STORE WRITING COMMANDS

A call store writing command utilizes as data to be stored a 23-bit word in the Data Buffer Register 2601. The outputs of the Data Buffer Register 2601 are transmitted to the Call Store Write Control.

CALL STORE READING COMMANDS

In the execution of call store reading commands the response includes a 24-bit word of data, an All-Seems-Well signal, and a synchronizing signal appearing as one-half microsecond pulses on the Call Store Response-Bus System 6501. The 24-bit word includes 23 bits of information to be utilized for data processing within Central Control 101 and a data parity bit. The call store response signals appear in parallel at the input terminals of the Call Store Response-Bus-Selection Gates 1300, which are enabled at time OT11.

In FIG. 8 it is indicated that within Central Control 101 the data processing of reading from a memory other than a Program Store 102 occurs in phase 2 during the execution cycle and with the Call Store Response-Bus-Selection Gates 1300 enabled for the time OT11 the call store response is returned prior to this time, that is, it is returned during phase 1 during the execution cycle. It should be noted that the Call Store Response-Bus-Selection Gates 1300 are enabled for a period of time which greatly exceeds the period, i.e., one-half microsecond of the call store response signals. This greater period of time permits acceptance of the full pulse width (approximately 0.5 microseconds) of the call store bus response signals without regard for variations in time of response of the Call Store 103 and variations in length of cable connecting the Call Store 103 and the Central Control 101.

The 24-bit response word is transmitted through AND-gate 2102.

PROGRAM STORE MEMORY ORDERS

Memory reading orders may also address memory locations within the Program Store 102. In such instances the indexing step produces a code-address corresponding to a program store memory location to be read. Memory reading orders for obtaining data from a Program Store 102 utilize the same channels for addressing the store and for receiving the response employed in obtaining program order words. When data is to be read from a Program Store 102 the Data-Reading Sequencer 4903 is activated. The sequencer is required since the obtaining of data from a Program Store 102 must be interleaved with the obtaining of program order words. Accordingly, this sequencer responds by storing the code-address of the next program order word temporarily in the Add-One Register 4304 and placing into the Program Address Register 4801 the data code-address by gating the outputs of the Index Adder Output Register 3401 thereto. The Data-Reading Sequencer 4903 extends the processing time of a memory-reading order by two 5.5-microsecond cycles. These two cycles are inserted in the operational step as set forth in FIG. 8 at the end of the indexing cycle and before the execution cycle. In the first cycle injected by the Data-Reading Sequencer 4903 the order following the memory-reading order is ignored and the data code-address is transmitted to the Program Address Register 4801. From there this code-address is transmitted as part of a program store command onto the Program Store Address-Bus System 6400. In the second machine cycle injected by the Data-Reading Sequencer 4903 the data reading is returned from the Program Store 102 via the Program Store Response-Bus System 6500 to the Buffer Order Word Register 2410. From there a selected half of the 44-bit data reading is transmitted to the Data Buffer Register 2601, the selected half determined by bit 20 of the code-address formed in the indexing step of the order. When these functions are completed the Data-Reading Sequencer 4903 is returned to the inactive state, and the memory reading order proceeds to its execution cycle wherein the data (now appearing in the Data Buffer Register 2601) is utilized to complete the operational step.

AUXILIARY BUFFER REGISTER MEMORY ORDERS

Memory reading and writing orders may also address a selected one of the auxiliary buffer registers (ABRI-ABRN).

In such instances the DAR word is a code-address corresponding to the selected one of the auxiliary buffer registers. This code-address appears in the Index Adder Output Register 3401 and is utilized to transmit data from the Data Buffer Register 2601 to a selected one of the auxiliary buffer registers for memory writing orders or to transmit data from a selected one of the auxiliary buffer registers to the Data Buffer Register 2601 for memory reading orders.

The address which selects the particular auxiliary buffer register for reading or writing appears in bit positions one through five of the Index Adder Output Register 3401 during the execution of the memory order.

COMMUNICATION VIA COMMAND ORDERS

The third major class of communication involves the generation and transmission of "commands" to the Central Pulse Distributor and the remainder of the Input-Output System 170.

The Central Control 101 utilizes program orders designated herein as command orders to generate such commands. Certain of these orders generate commands to be transmitted only to the Central Pulse Distributor 143; these orders are designated herein as CPD orders and the commands associated with these orders are designated as CPD commands. Other command orders generate information on the Command Bus 6406; these are designated as Input-Output command orders and the generation of information on the Network Command Bus 6406 is designated herein as network commands. The network command orders employ an Input-Output CPD command to designate a particular Input-Output unit which is to respond to the Input-Output command.

In that the Central Pulse Distributor 143 is employed in the execution of both CPD orders and Input-Output command orders, communication with the Central Pulse Distributor will be described first. The Central Pulse Distributor (not shown) is a high-speed electronic translator which provides two classes of output signals in response to CPD commands. The first class of output signals is termed unipolar signals and the second class is termed bipolar signals. Commands are transmitted from the Central Control 101 to the Central Pulse Distributor in the form of half microsecond pulses. The information required to control a Central Pulse Distributor is transmitted in three successive waves which are each separated by 1.25 microseconds. Bus choice information which indicates that the central pulse distributors are to accept information from either the 0 or 1 bus of the CPD Address-Bus System is transmitted in the first wave to all central pulse distributors via a CPD Bus Choice Bus. The Second wave consists of the CPD address transmitted on a selected 0 or 1 bus of the CPD Address-Bus System 6403 to all central pulse distributors. The CPD address consists of signals which are to be translated by the Central Pulse Distributor 143 into a half-microsecond output pulse appearing on a selected unipolar or bipolar output. The third wave consists of a half-microsecond execute pulse transmitted on one of a plurality of cable pairs in the Execute Cable 6404. Corresponding to each cable pair in the execute cable is a discrete unit of the Central Pulse Distributor, and the execute pulse serves to select the unit which is to carry out the translation of the CPD address signals. The central pulse distributor units which do not receive the execute pulse do not carry out this translation, and the third wave serves thereby as part of the translation of the coded data within Central Control 101 into a pulse appearing on a selected discrete unipolar or bipolar output of the Central Pulse Distributor.

The operational step of command orders includes the information of data to specify the CPD address, the CPD execute signal, and/or the network command information. If, for example, the order X in FIG. 8 is a command order, the data is placed in the appropriate flip-flop registers within Central Control 101 during phase 2 of cycle 3, and accordingly the second and third wave information is generated only after this data is so registered. The generation of the three waves of CPD command information for the order X is correspondingly generated during 10T12, 15T17, and 20T22 of cycle 3.

The Central Pulse Distributor in executing commands returns responses to the Central Control 101 as half-microsecond pulses; the time of arrival of these pulses at Central Control 101 is dependent on the response time of the Central Pulse Distributor and the lengths of the buses connecting the Central Control 101 and the Central Pulse Distributor. In the example of FIG. 8 gating signals lasting from T19 of cycle 3 until T12 of cycle 4 (a 3.75-microsecond span) are employed to gate these responses of the Central Pulse Distributor. It may be noted that this last gating action as well as the transmission of the second and third waves of the CPD command are generated after the order X has been replaced by the orders X+1 and X+2 in the Central Control 101; the Command Order Sequencer 4902 is therefore activated in the execution of the order X to carry out those gating actions.

If the order X is an Input-Output command order, the Command Order Sequencer (one of the sequencers 1—N) is also employed to carry out the gating actions associated with the CPD command, and further the gating actions associated with the transmission of address information to the network command bus. In the execution of network command orders the network command unit returns responses to the Central Control 101 within a span of time that may extend to T5 of cycle 5. Accordingly, the Command Order Sequencer remains active to carry out all of the gating actions of the network command order which may extend to the end of phase 1 of cycle 5. It is with the aid of the Command Order Sequencer that the Central Control 101 extends the degree of overlap beyond that exhibited in FIG. 8. If the order X is a network command order, then gating actions associated with the operational step of order X will be simultaneously occurring with the execution cycle of the order X+2, at the time the order X+3 is arriving at the Buffer Order Word Register 2410, and at the time the address of the order X+4 is being transmitted on the Program Store Address-Bus System 6400.

What is claimed is:

1. A program-controlled data-processor system comprising
   - a control arrangement for executing sequences of program order words,
   - a memory system containing sequences of program order words and data and
   - an input-output system;
   - said control arrangement comprises first and second circuit arrangements, each comprising a register circuit and a decoding circuit, said first circuit arrangement is responsive to the instruction portion of a first order word of a sequence and generates control signals to control a portion of said control arrangement, said second circuit arrangement is responsive to a second order word of said sequence and generates further control signals in accordance with said instruction portion of said second order word, a third circuit arrangement which generates and transmits a coded signal to said memory system to obtain for said second circuit arrangement a third order word of said sequence, and said control arrangement transfers each succeeding order word from said second circuit arrangement to said first circuit arrangement at a particular time in each control arrangement time cycle, said third, second and first circuit arrangements being individually operative with respect to each order word which is executed by said control arrangement and said third, said second and said first circuit arrangements are contemporaneously operative with respect to three successive order words.

2. In combination, memory means; and a central control comprising:
   - memory-accessing means for generating and transmitting commands for reading information from said memory means,
   - clock means defining central control machine cycles, a buffer order word register connected to buffer order word decoding means for controlling portions of said central control in response to instructions in said buffer order word register, an order word register connected to order word decoding means for controlling portions in said central control in response to instructions in said order word register, means including said clock means for transferring the contents of a portion of said buffer order word register to said order word register at a distinct time in said central control machine cycle, and circuit means for controlling said memory-accessing means for transferring an immediately succeeding order word into said buffer order register at a second distinct later time, the difference in time between said first and second said distinct times being less than the time required to obtain information from said memory arrangement, said buffer order word decoding means and said order word decoding means; said buffer order word decoding means, said order word decoding means and said memory accessing means being individually operative with respect to each order word which is executed by said control arrangement and operative on an overlap basis with respect to three successive instructions.

3. The combination in accordance with claim 2 wherein said memory means comprises a program store for storing sequences of instructions and data and a call store for storing data, and said central control comprises means for simultaneously communicating with said program store and said call store.

4. In combination, a program store containing sequences of program order words and data, a data store containing data, a central control comprising means for reading information from said stores, a buffer order word register, a buffer order word decoder responsive to information stored in said buffer order word register for controlling said central control, an order word register, an order word decoder responsive to said information stored in said order word register for controlling said central control, and said central control includes means for simultaneously communicating with said program store and with said data store.

5. In combination, a plurality of control circuits, a central control, a first memory means for storing sequences of program order words and first data, a second memory means for storing other data, and transmission means interconnecting said central control with said first memory means, said second memory means and said control circuits;

said central control comprising means responsive to said program order words for concurrently:

a. carrying out data processing in response to a first order word, b. carrying out data processing in response to an immediately succeeding second order word, and c. generating and transmitting a coded signal to said first memory means to obtain a third order word therefrom.

6. The combination in accordance with claim 5 wherein said data processing in response to said second order word includes the generation and transmission of a code-address to said second memory means to obtain a data reading therefrom.

7. In combination, a program store, a data store, a central control, said central control comprising means for reading information from said program store, means for reading information from said data store, a buffer order word register, an order word register, a buffer order word decoder responsive to information stored in a portion of said buffer order word register for controlling said central control, an order word decoder responsive to the information stored in said order word register for controlling said central control, and A program-controlled data-processor system in accordance with claim 2 wherein said control arrangement further comprises:

a mixed decoder responsive to instructions simultaneously stored in said order word register and in said buffer order word register for altering the responses of said buffer order word decoding means.

8. A program-controlled data-processor system in accordance with claim 7 wherein said control arrangement further comprises a plurality of flip-flop registers, and a masked bus connected to input terminals of said flip-flop registers, an unmasked bus connected to output terminals of said flip-flop registers, and wherein when the order word currently in said order word register is a data reading order which specifies a particular flip-flop register within central control as the destination for the data read and the order word currently in the buffer order word register specifies said destination register as a source register for indexing, said mixed decoder in response to said specified order words alters the operation of said buffer order word decoding means to substitute the information occurring on said masked bus for information occurring on said unmasked bus for indexing.

9. In combination, a memory arrangement, a central control comprising means for reading information from said memory arrangement, a buffer order word register, an order word register, a buffer order word decoder responsive to information stored in a portion of said buffer order word register for controlling said central control, an order word decoder responsive to the information stored in said order word register for controlling said central control, means for transferring information from said buffer order word register to said order word register in distinct times defined by a clock circuit in said central control, said buffer order word decoder and said order word decoder being operative with respect to each successive order word and a mixed decoder connected to said buffer order word register and to said order word register and responsive to information stored in said order word register and a portion of said information stored in said buffer order word register for altering the responses of said buffer order word decoder.

10. In combination, a program store, means for reading information from said program store, and means responsive to said information read from said store, said means responsive including a system clock defining discrete machine cycles, phases within said cycles, and periods of time within each of said phases, said program order words comprising a data address field, an operation field, and a check field, said central control comprising a buffer order word register arranged to receive all of said elements of said program order word, an auxiliary buffer order word register interposed between said program store and the operation portion of said buffer order word register, and gating means interposed between the output terminals of said auxiliary buffer order word register and the operation portion of said buffer order word register, and control means responsive to said clock means for gating the contents of said auxiliary buffer order word register to said buffer order word register.

11. In combination, a program store containing sequences of program order words, certain of said order words being data-processing-transfer order words, a data store containing system data, a central control comprising means for obtaining information from said stores, for writing information into said data store and for executing said sequences of program order words, means responsive to the execution of said data processing-transfer order words for generating transfer signals and advance signals, and means responsive to said advance signals for carrying out data processing specified by a portion of said data processing-transfer order words.

12. In combination, a memory system containing sequences of program order words and data, said sequences including data processing-decision order words;

a central control comprising means for reading information from said memory system and for writing data into said memory system, means for executing said program sequences, a plurality of flip-flop registers, a plurality of data processing means, means responsive to said data processing-decision order words to examine the contents of a selected one of said flip-flop registers, and 13. A program controlled data processor system comprising a data bus system including an unmasked bus, a mask and complement circuit, and a masked bus, a plurality of flip-flop registers connected to said bus system, and a homogeneity circuit connected to said bus system for observing the homogeneity of data words transmitted over said bus system, a control homogeneity flip-flop responsive to output signals of said homogeneity circuit for generating signals representing the homogeneity of observed data words, a control sign circuit for observing a specified sign bit of data words transmitted via said bus system, a control sign flip-flop responsive to output signals of said control sign circuit for generating output signals representative of the sign of observed data words, memory means containing sequences of program order words and data, program order word register means, means for transferring program order words from said memory means to said program order word register means, decoding means responsive to said program order words, and decision logic responsive to the output signals of said control homogeneity flip-flop and said control sign flip-flop and to output signals of said decoding means for generating system advance and system transfer signals for determining the next program order word to be obtained from said memory means.

14. A program-controlled system comprising means for obtaining program order words, means for obtaining data, a plurality of homogeneity circuits for observing the homogeneity of data occurring in various portions of said system, a plurality of sign circuits for observing the sign of data words occurring at various locations within said system, decision logic connected to output terminals of said plurality of homogeneity circuits and said sign circuits, and decoding means responsive to said program order words for controlling said system, said decision logic responsive to output signals of said decoding means for generating program advance and program transfer signals in accordance with homogeneity and sign information occurring on selected ones of said homogeneity and said sign circuit output conductors, said selection being determined by output signals of said decoding means.

15. In a program-controlled system, the combination in accordance with claim 14 wherein said decoding means comprises a buffer order word decoder and an order word decoder, said decision logic responsive to output signals of said buffer order word decoder and said homogeneity and said sign circuits to generate system advance and system early transfer signals, said decision logic responsive to output signals of said order word decoder and of said homogeneity circuits and said sign circuits to generate system advance and system late transfer signals.

16. A program-controlled data processor for controlling an input-output system comprising:

a program store containing sequences of program order words, said program order words comprising nondecision orders and decision orders, said decision orders comprising a first class of orders which specify a data reading or writing after a decision to advance has been reached, a second class of orders which do not specify a data reading or writing after said decision to advance has been reached;

a central control comprising clock means defining a discrete machine cycle, and a plurality of discrete times within said cycle, decision logic, and means for reading said sequences of program order words from said program store, and means responsive to said program order words for controlling said input-output system, said means responsive comprising a buffer order word register, a buffer order word decoder, said buffer order word decoder effective to generate control signals for said decision logic in response to orders of said first class for causing said decision logic to generate advance signals and early transfer signals at a first discrete time in said machine cycle, said central control further comprising an order word register, and an order word decoder, said order word decoder responsive to order words of said second class to generate control signals for said decision logic for causing said decision logic to generate system advance and system late transfer signals at a second discrete time in said machine cycle.

17. In combination, a program order word information source;

a data word information source; and a central control responsive to information read from said information sources for determining the operation thereof, said central control comprising a plurality of general purpose flip-flop registers, an accumulator register, an accumulator register input circuit, and an accumulator register homogeneity circuit for observing the homogeneity of the contents of said accumulator register.

18. The combination in accordance with claim 17 wherein central control further comprises an accumulator logic homogeneity circuit for observing the homogeneity of information appearing at the output terminals of said accumulator input circuit.

19. In a central control of a program-controlled system, an accumulator register circuit, first and second accumulator input registers, an accumulator register logic circuit for selectively logically combining the contents of said first and second accumulator input registers, gating means for transmitting output signals from said accumulator logic circuit to said accumulator register, and a rotate-shift circuit, the input terminals of said rotate-shift circuit connected to the output terminals of said accumulator register, the output terminals of said rotate-shift circuit connected to the input terminals of said accumulator register, a rotate-shift distance and direction information source connected to distance and direction terminals of said rotate-shift circuit, and means in said central control for selectively generating rotate-shift control signals, said rotate-shift circuit responsive to said input signals at said distance and direction terminals and to said control signals for generating at said output terminals thereof a data word resulting from the selective shifting and rotating of the data word occurring at the output terminal of said accumulator register.

20. The system in accordance with claim 19 wherein said central control further comprises an indexing system, said indexing system comprising an addend register, an augend register, an index adder for adding the contents of said addend and said augend registers, an index adder output register, and wherein the output terminals of said index adder are connected to said distance and direction input terminals.

21. The system in accordance with claim 24 wherein said rotate-shift distance and direction information source provides an $(n+1)$-bit word, the first $n$ bits of said word comprising a code word defining the distance said rotate-shift circuit is to rotate or shift the word occurring at the input terminals thereof and the remaining bit of said word defining the direction of rotation or shift.

22. The system in accordance with claim 19 wherein said rotate-shift control signals comprise:

a. a rotate signal, b. a shift signal, c. a limited rotate signal, and d. a complement signal, said complement signal effective to reverse the direction of shift or rotate specified by said distance and direction information source.

23. In combination, a flip-flop register, a rotate-shift circuit, input terminals of said rotate-shift circuit connected to the output terminals of said flip-flop register, output terminals of said rotate-shift circuit connected to the input terminals of said rotate-shift circuit, an indexing system comprising an addend register, an augend register, an index adder for adding the contents of said addend and said augend registers, an index adder output register, the output terminals of said index adder connected to distance and direction input terminals of said rotate-shift circuit, means in said central control for generating rotate-shift control signals, said rotate-shift circuit responsive to said input signals at said distance and direction terminals and to said control signals for generating at said output terminals thereof a data word resulting from the selective shifting and rotating of the data word occurring at the output terminals of said flip-flop register.

24. In combination, an accumulator register and a detect first-one circuit connected to the output terminals of said accumulator register for generating coded data words defining the first bit position of said accumulator register in which a 1 occurs.

25. The combination in accordance with claim 24 further comprising a first-one register, means for selectively connecting the output terminals of said first-one circuit to the input terminals of said first-one register, a reset first-one circuit for generating reset signals, the input terminals of said reset first-one circuit connected to the output terminals of said first-one register, and means for generating a reset first-one control signal, and a plurality of AND-gates, the output terminals of said reset first-one circuit connected to the reset input terminals of said accumulator register via said plurality of AND-gates, and means for controlling said plurality of AND-gates by said reset first-one control signal.

26. The combination in accordance with claim 25 wherein said reset first-one circuit comprises a translator for converting an $n$-bit binary code to a 1-out-of $N$ code.

27. In combination, a memory, sequences of program order words, and a central control, said central control comprising a masked bus, an unmasked bus, means for generating code-addresses for obtaining program order words from said memory, said means including a program address register, means for transmitting said code-addresses to said memory, and means for incrementing said code-addresses by a count of 1, said means for incrementing comprising an add-one register having input terminals connected to the output terminals of said program address register, an add-one circuit having input terminals connected to the output terminals of said add-one register and output terminals connected to the input terminals of said program address register, input terminals of said add-one register connected via gating circuits to said central control unmasked bus and to said central control masked bus, said output conductors of said add-one circuit connected to said masked bus via gating circuits, and means responsive to said program order words for generating control signals for enabling said add-one circuit and said gating circuits.

28. A program-controlled data processor comprising a program store, a data store, a central control including a masked bus and an unmasked bus, a program address register, means for transmitting the contents of said program address register to said program store to obtain information therefrom, means in said central control defining a basic machine cycle, a plurality of phases within said machine cycle, and a plurality of distinct times within each of said phases, said central control further comprising means defining an order operational step period, said operational step period extending beyond one machine cycle, means connected to the output terminals of said program address register for incrementing the code-address stored therein by a count of 1, said means effective during a first portion of said operational step period, means connecting said unmasked bus and said masked bus of the central control to both the input terminals and the output terminals of said incrementing circuit, and control means effective to gate information from said unmasked bus and said masked bus to said incrementing circuit and from said incrementing circuit to said unmasked bus and said masked bus during a second subsequent time in said operational step period.

29. In combination, a program store containing sequences of program order words, certain of said order words representing single cycle orders and others of said order words representing multicycle orders;

a central control comprising means for reading information from said program store, clock means defining a central control machine cycle, phases within said cycle and times within said phases, a buffer order word register, means for transferring information from said program store to said buffer order word register, a buffer order word decoder responsive to the contents of said buffer order word register for controlling portions of said central control, an order word register, means for transmitting the contents of said buffer order word register to said order word register at a distinct time in said machine cycle, an order word decoder responsive to the contents of said order word register for controlling portions of said central control, and sequencer means responsive to sequencer enable output signals of said order word decoder for causing said central control to perform selected repeated central control work functions, said sequencer means effective to control portions of said central control beyond the period of time that the order which enabled said sequencer resides in said order word register.

30. The combination in accordance with claim 29 wherein said central control further comprises operational checking means for checking the validity of the contents of said buffer order word register and for generating a trouble signal on detection of invalid contents, remedial means responsive to said trouble signals for carrying out remedial work functions, said remedial means generates output signals for inhibiting the transmitting of the contents of said buffer order word register to said order word register and to inhibit the operation of said buffer order word decoder and said order word decoder.

31. The combination in accordance with claim 29 wherein said central control further comprises operational checking means for checking the validity of information obtained from said data store and for generating trouble signals upon detection of invalid information, remedial means responsive to said trouble signals for carrying out remedial work functions, said remedial means generates output signals for inhibiting the operation of said buffer order word decoder and said order word decoder and for inhibiting the transmitting of the contents of the said buffer order word register to said order word register.

32. A program-controlled data-processor system comprising an input-output system, a program store containing sequences of program order words, certain of said order words, including input-output command orders, representing single cycle orders and other of said order words representing multicycle orders, a data store, a central control comprising means for reading information from said program store and from said data store, means responsive to said input-output command program order words for generating input-output commands for controlling said input-output system, said central control comprising instruction registers and decoder means concurrently operative with respect to three successive single-cycle program-order words with a fixed degree of operational overlap between successive orders, said means for generating input-output commands comprises an input-output command sequencer means which extends the data processing time for input-output command program orders beyond a period of time required to execute other single-cycle orders and thereby extends the degree of operational overlap between an input-output command order and succeeding orders.

33. A program-controlled data-processor system comprising an input-output system, a program store containing sequences of program order words, certain of said order words, including input-output command order words, representing single-cycle orders and other of said order words representing multicycle orders, a central control comprising means for reading information from said program store and from said data store, clock means defining a central control machine cycle, phases within said cycle, and times within said phases, a buffer order word register, means for transmitting information read from said program store to said buffer order word register, a buffer order word decoder responsive to the contents of said buffer order word register for controlling portions of said central control, an order word register, means for transmitting the contents of said buffer order word register to said order word register at a distinct time in said machine cycle, an order word decoder responsive to the contents of said order word register, an input-output command sequencer responsive to enable output signals of said order word decoder for generating input-output commands for controlling said input-output system, said input-output command sequencer effective to control portions of said central control beyond the period of time that the succeeding program order word resides in said buffer order word register.

34. A program-controlled data-processor system comprising an input-output system, a program store containing sequences of program order words, certain of said order words, including input-output command order words, representing single cycle orders and other of said order words representing multicycle orders, a central control comprising clock means defining a central-control machine cycle, phases within said cycle, and times within said phases, means for reading program order words from said program store at fixed times within each successive machine cycle, a buffer order word register for receiving program order words read from said program store, a buffer order word decoder responsive to the contents of said buffer order word register for controlling a portion of said central control, an order word register, means for transferring the contents of said buffer order word register to said order word register at a second fixed time in each successive machine cycle, an order word decoder responsive to the contents of said order word register, an input-output command sequencer, said order word decoder responsive to the occurrence of an input-output command order in said order word register for generating an input-output command sequencer enable signal, said input-output command sequencer effective when enabled to generate input-output commands for controlling said input-output system, said input-output command sequencer operative beyond said second fixed time of machine cycles immediately following the cycle in which the input-output command order occurred in said order word register.

35. In combination, a program store containing sequences of program order words, a data store, a central control comprising means for reading information from each of said stores, decoding means responsive to program order words read from said program store for controlling said central control, clock means defining central control machine cycles, said decoding means responsive to each of said program order words for an operational step period of time, said operational step period being longer than one machine cycle and comprising two distinct time periods, checking means in said central control responsive to program order words read from said program store for checking the plausibility of program store responses, said checking means operative to generate error signals upon detection of an implausible response, sequencer means responsive to said error signals for interrupting the operation of said decoding means during the indexing cycle of the operational step of an order word which the checking circuit indicated as implausible, said sequencer effective to generate a command for rereading said program store at the address from which the implausible response was obtained, and means for returning control of central control to said decoding means.

36. In combination, a program store containing sequences of program order words, a central control, means in said central control for generating code-addresses for sequentially reading order words from said program store at regular intervals, checking means responsive to program order words read from said program store, said checking means generates an error signal upon detection of an error in one of said program order words, means responsive to said error signal for momentarily interrupting said sequential obtaining of program order words, said interrupting means including means for generating and transmitting a code-address corresponding to the code-address of the program order word in which an error was detected.

37. In combination, a program store containing sequences of program order words, certain of said order words being transfer order words, a data store containing system data, a central control for obtaining information from said stores, for writing information into said data store, and for executing said sequences of program order words, means responsive to the execution of said transfer orders for generating transfer signals and advance signals, and transfer means responsive to said transfer signals for obtaining a data word defining the order to be transferred to, said last-named means including means for obtaining information from said program store or from said data store as specified by a portion of said transfer order.

38. The combination in accordance with claim 37 wherein said transfer means comprises a transfer sequencer which momentarily inhibits output signals of said decoding means and generates output signals which cause said central control to selectively obtain information from said program store or from said data store.

39. The combination in accordance with claim 38 wherein said central control further comprises a plurality of flip-flop registers, said transfer sequencer further comprises means for generating signals for selectively modifying the contents of a selected one of certain of said flip-flop registers as determined by a portion of said transfer order word.

40. In combination, a program store containing sequences of program order words and data, a data store containing system data;

a central control comprising means for obtaining information from said stores and means for writing information into said data store, executing means responsive to said sequences of program order words, an order word register, a data register, transmission means interconnecting said data store and said central control, and gating means for selectively gating information from said transmission means to said data register and to said order word register, said executing means including means for generating gate control signals for selectively transmitting said data to said data register and to said order word register.

41. In combination, a central data processor comprising a program store containing sequences of program order words, certain of said order words being data processing-transfer order words, a data store containing system data, a central control comprising means for obtaining information from said stores, means for writing data into said data store, data processing means, and decoding means responsive to said sequences of program order words;

said decoding means responsive to said data processing-transfer order words for generating control signals for carrying out specified data processing actions in said data processing means and for generating transfer control signals, and transfer means responsive to output signals of said data processing means resulting from said specified data processing action and to said transfer control signals for generating system advance and system transfer signals.

42. In combination, a program store containing sequences of program order words and data, said program store in response to commands generates 44-bit responses, each of said responses including a 7-bit Hamming error check field;

a central control comprising means for generating commands for obtaining information from said program store, an order word register for storing responses from said program store, an order word decoder connected to an operation field portion of said order word register, an index adder system comprising an index adder, an index adder addend register, an index adder augend register, gating means interconnecting said order word register and said index adder addend register, and means for generating control signals for said gating means, said gating means comprising means for selectively:

a. transmitting the contents of the first 23 bits of said order word register to said addend register without modification, b. for transmitting the first 21 bits of said order word register to said addend register, expanding bit 21 to provide a 23-bit word in said addend register, c. transmitting bits 21 through 36 of said order word register to said addend register without modification, and d. transmitting bits 41 through 43 of said order word register to said addend register without modification.

43. In combination, a program store containing sequences of program order words and data;

a central control comprising means for generating commands for obtaining information from said program store, an order word register for storing information obtained from said program store, order word decoding means, an index-adder system, gating means interposed between said order word register and said index-adder system, and means for generating control signals for said gating means, said gating means comprising means for selectively:

a. transmitting without modification selected portions of the contents of said order word register to said index adder system, and b. transmitting a selected portion of the contents of said order word register with one bit of said portion expanded to provide a data word having more bits than said portion.

44. In combination, a program store containing sequences of program order words and system data, certain of said order words being memory reading control order words, a data store containing system data, a central control comprising means for obtaining information from said stores and for writing data into said data store, means for executing said sequences of program order words, a control decision register, a data buffer register for storing information obtained from said stores, gating means for transmitting a portion of the contents of said data buffer register to said control decision register, means responsive to the execution of said memory reading control order words to generate control signals to enable said gating means, and decision logic responsive to certain of said order words and the states of said control decision register for generating transfer signals and advance signals.

45. In combination, a memory-containing sequence of program order words and system data, a central control comprising means for reading information from said memory and for writing data into said memory, means for executing said program sequences, an unmasked bus, a masked bus, first gating means interposed between said unmasked bus and said masked bus, a plurality of data sources, a plurality of data destinations, and means responsive to the execution of said sequences of program order words to simultaneously gate information from a selected data source to a selected data destination via said masked bus and to gate other information from a second selected data source to a second selected data destination via said unmasked bus.

46. A processor to provide processing of present and anticipated instructions, said processor comprising:

a. an instruction executing final station means, b. means for processing instructions prior to their arrival at said final station, c. means for determining before execution of an instruction whether a branch or other occurrence will be effected which would make preprocessing steps and manipulation of data undesirable to be executed, and d. means responsive to said determining means for preventing further preprocessing by said prior processing means.

47. The processor of claim 46, said determining means comprising an advance station control and jump control means operating in conjunction and responsive in accordance with results of a conditional jump operation where present in said anticipated instructions to decide and implement a decision selectively to allow processing in said final station and to prevent processing in said final station.

* * * * *

PO-1050
(5/69)

UNITED STATES PATENT OFFICE
CERTIFICATE OF CORRECTION

Patent No. 3,623,008 Dated November 23, 1971

Inventor(s) Anton H. Doblmaier, John A. Harr, Frank F. Taylor, and Werner Ulrich It is certified that error appears in the above-identified patent and that said Letters Patent are hereby corrected as shown below:

Column 2, line 6, after "third" cancel "decoded" and insert --decoder--;

line 7, after "mixed" cancel "decoded" and insert --decoder--;

Column 3, line 56, after "by" cancel "what" and insert --that--.

Column 7, lines 51 and 52 should be deleted in their entirety as follows: "The basic ... intervals."

line 66, after "phase" delete "20" and insert --2--.

Column 9, line 2, after "3904" cancel "(BOWD)" and insert --(OWD)--.

Column 11, line 37, after "Register" cancel "2401" and insert --2410--.

Column 20, line 52, the "X" for "Standby Central Control 101" is misplaced and should be inserted under the column "Write Command".

Column 21, line 27, after "parity" cancel "it" and insert --bit--.

PO-1050
(5/69)

UNITED STATES PATENT OFFICE
CERTIFICATE OF CORRECTION

Patent No. 3,623,008 Dated November 23, 1971

Inventor(s) Anton H. Doblmaier, John A. Harr, Frank F. Taylor, and Werner Ulrich

It is certified that error appears in the above-identified patent and that said Letters Patent are hereby corrected as shown below:

Column 25, claim 7, delete lines 70 through 75.

Column 26, claim 7, delete lines 1 through 9;

line 10, before "A program controlled...", insert --7.---.

Column 27, line 33 (claim 12), after "and" insert --means responsive to the states of said selected flip-flop register and said data processing-decision order words for generating control signals for said data processing means.---.

Column 29, line 30 (claim 21), after "claim" cancel "24" and insert --19--.

Column 36, line 5 (claim 45), after "memory" delete the hyphen and after "containing" change the word "sequence" to --sequences--.

Signed and sealed this 9th day of May 1972.

(SEAL)
Attest:

EDWARD M.FLETCHER,JR.
Attesting Officer

ROBERT GOTTSCHALK
Commissioner of Patents